US010755296B2

(12) United States Patent
Teevan et al.

(10) Patent No.: US 10,755,296 B2
(45) Date of Patent: Aug. 25, 2020

(54) PROVIDING REWARDS AND METRICS FOR COMPLETION OF MICROTASKS

(71) Applicant: Microsoft Technology Licensing, LLC, Redmond, WA (US)

(72) Inventors: Jaime B. Teevan, Bellevue, WA (US); Saleema Amershi, Seattle, WA (US); Shamsi Tamara Iqbal, Sammamish, WA (US); Daniel John Liebling, Seattle, WA (US); Semiha Ece Kamar Eden, Redmond, WA (US); Kristina N. Toutanova, Redmond, WA (US); Robert Warren Gruen, Seattle, WA (US); Darren Francis Gehring, Carnation, WA (US); Pallavi Choudhury, Redmond, WA (US); Ann Paradiso, Redmond, WA (US); Anthony Lee Carbary, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 692 days.

(21) Appl. No.: 15/197,397

(22) Filed: Jun. 29, 2016

(65) Prior Publication Data

US 2017/0103407 A1    Apr. 13, 2017

Related U.S. Application Data

(63) Continuation-in-part of application No. 14/880,305, filed on Oct. 12, 2015, now abandoned.

(51) Int. Cl.
*G06Q 30/02*    (2012.01)

(52) U.S. Cl.
CPC ............................. *G06Q 30/0208* (2013.01)

(58) Field of Classification Search
CPC ........ G06Q 10/00; G06Q 40/06; G06Q 40/00; G06F 17/60
(Continued)

(56) References Cited

U.S. PATENT DOCUMENTS 5,732,221 A    3/1998 Feldon et al.
8,479,094 B2    7/2013 Fouts et al.
(Continued)

OTHER PUBLICATIONS

Stross "When the Assembly Line Moves Online", Oct. 2010, The New York Times, pp. 1-4 (Year: 2010).*
(Continued)

*Primary Examiner* — Romain Jeanty
(74) *Attorney, Agent, or Firm* — Goff IP Law PLLC; Jared Goff

(57) ABSTRACT

Edits on a content item, such as a document, are divided into microtasks. The microtasks associated with a document can be automatically identified based on a workflow or can be identified by a user associated with the content item or an administrator. At a later time, the user can complete the microtasks for a content item using an application associated with their smart phone or tablet. The application may present the microtasks in a game-like environment where the user can compete with other users based on metrics such as number of microtasks completed in a day or fastest completion time. In addition, the user can earn rewards such as badges, coupons, or credits by completing microtasks. In this way, users can use time that would have been wasted playing games to complete their content items, while still experiencing some of the fun and competition associated with the games.

20 Claims, 14 Drawing Sheets

(58) Field of Classification Search
USPC .............................................. 705/7.12–7.16
See application file for complete search history.

(56) References Cited

U.S. PATENT DOCUMENTS

| | | | | |
|---|---|---|---|---|
| 8,626,545 | B2* | 1/2014 | Van Pelt | G06Q 10/06398 |
| | | | | 705/7.13 |
| 8,694,350 | B1* | 4/2014 | Cohen | G06Q 10/10 |
| | | | | 705/7.13 |
| 8,874,477 | B2* | 10/2014 | Hoffberg | G06Q 10/0631 |
| | | | | 705/37 |
| 9,411,917 | B2* | 8/2016 | Gil | G06F 17/5009 |
| 9,483,306 | B2* | 11/2016 | Tajima | G06F 9/4887 |
| 10,055,698 | B2 | 8/2018 | Elenbaas et al. | |
| 2002/0089687 | A1 | 7/2002 | Ferlitsch et al. | |
| 2005/0209902 | A1 | 9/2005 | Iwasaki et al. | |
| 2009/0199185 | A1* | 8/2009 | Slawson | G06Q 10/06 |
| | | | | 718/100 |
| 2009/0293040 | A1 | 11/2009 | DeBoer et al. | |
| 2010/0063860 | A1* | 3/2010 | Gallion | G06Q 10/06311 |
| | | | | 705/7.27 |
| 2011/0313801 | A1* | 12/2011 | Biewald | G06Q 10/06 |
| | | | | 705/7.12 |
| 2012/0054112 | A1* | 3/2012 | Gormish | G06Q 10/06 |
| | | | | 705/301 |
| 2012/0246655 | A1 | 9/2012 | Chaar et al. | |
| 2013/0006717 | A1* | 1/2013 | Oleson | G06Q 10/06311 |
| | | | | 705/7.41 |
| 2013/0124642 | A1 | 5/2013 | Bansal et al. | |
| 2013/0317871 | A1* | 11/2013 | Kulkarni | G06Q 10/063112 |
| | | | | 705/7.14 |
| 2014/0122188 | A1* | 5/2014 | Van Pelt | G06Q 10/06311 |
| | | | | 705/7.42 |
| 2014/0358605 | A1 | 12/2014 | Balamurugan et al. | |

OTHER PUBLICATIONS

Hsieh-Lung Hsu "A Microtasking Algorithm for Optimization of Structure" .Dec. 1991, The International Journal of Supercomputer Applications, vol. 5, No. 2, pp. 81-90 (Year: 1991).*
"Complex Sentence Generator", Retrieved from <<http://www.csgenerator.com/>>, Retrieved on Jun. 8, 2015, 2 Pages.
Allen, David, "Getting Things Done: The Art of Stress-Free Productivity", Penguin Books Publication, Jan. 2003, 278 Pages.
Bernstein, et al., "Personalization via Friendsourcing", In Proceedings of CM Transactions on Computer-Human Interaction,vol. 17, Issue 2, Article No. 6, May 1, 2010, 28 Pages.
Bernstein, et al., "Soylent: A Word Processor with a Crowd Inside", In Proceedings of the 23nd Annual ACM Symposium on User Interface Software and Technology, Oct. 3, 2010, 10 Pages.
Birnholtz, et al., "Tracking Changes in Collaborative Writing: Edits, Visibility and Group Maintenance", In Proceedings of the ACM Conference on Computer Supported Cooperative Work, Feb. 11, 2012, pp. 809-818.
Birnholtz, et al., "Write Here, Write Now!: An Experimental Study of Group Maintenance in Collaborative Writing", In Proceedings of the SIGCHI Conference on Human Factors in Computing Systems, Apr. 27, 2013, 10 Pages.
Cai, et al., "Wait-Learning: Leveraging Wait Time for Second Language Education", In Proceedings of the 33rd Annual ACM Conference on Human Factors in Computing Systems, Apr. 18, 2015, 10 Pages.
Cheng, et al., "Break It Down: A Comparison of Macro- and Microtasks", in Proceedings of the 33rd Annual ACM Conference on Human Factors in Computing Systems, Apr. 18, 2015, 4 Pages.
Chilton, et al., "Cascade: Crowdsourcing Taxonomy Creation", In Proceedings of the SIGCHI Conference on Human Factors in Computing Systems, Apr. 27, 2013, 10 Pages.
Cutrell, et al., "Notification, Disruption, and Memory: Effects of Messaging Interruptions on Memory and Performance", In Proceedings of the IFIP Conference on Human-Computer Interaction, Jul. 9, 2001, 7 Pages.

Dillon, Andrew, "How Collaborative is collaborative Writing? An Analysis of the Production of Two Technical Reports", In Computer Supported Collaborative Writing, Jan. 1993, 15 Pages.
Faste, et al., "Brainstorm, Chainstorm, Cheatstorm, Tweetstorm: New Ideation Strategies for Distributed HCI Design", In Proceedings of the SIGCHI Conference on Human Factors in Computing Systems, Apr. 27, 2013, pp. 1343-1352.
Gonzalez, et al., "Constant, Constant, Multi-Tasking Craziness: Managing Multiple Working Spheres", In Proceedings of the SIGCHI Conference on Human Factors in Computing Systems, Apr. 24, 2004, pp. 113-120.
Hart, et al., "Development of NASA-TLX (Task Load Index): Results of Empirical and Theoretical Research", In Proceedings of Advances in Psychology, Dec. 1988, 46 Pages.
Iqbal, et al., "Disruption and Recovery of Computing Tasks: Field Study, Analysis, and Directions", In Proceedings of the SIGCHI Conference on Human Factors in Computing Systems, Apr. 29, 2007, 10 Pages.
IQBAL, et al., "Effects of Intelligent Notification Management on Users and Their Tasks", In Proceedings of the SIGCHI Conference on Human Factors in Computing Systems, Apr. 5, 2008, pp. 93-102.
Kim, et al., "Ensemble: Exploring Complementary Strengths of Leaders and Crowds in Creative Collaboration", In Proceedings of the 17th ACM Conference on Computer Supported Cooperative Work & Social Computing, Feb. 15, 2014, 11 Pages.
Kittur, et al., "Crowd Forge Crowdsourcing Complex Work", In Proceedings of the 24th Annual ACM Symposium on User Interface Software and Technology, Oct. 16, 2011, pp. 43-52.
Kittur, et al., "The Future of Crowd Work", In Proceedings of the conference on Computer Supported Cooperative Work, Feb. 23, 2013, 17 Pages.
Kokkalis, et al., "TaskGenies: Automatically Providing Action Plans Helps People Complete Tasks", In Proceedings of ACM Transactions on Computer-Human Interaction, vol. 20, Issue 5, Article No. 27, Nov. 1, 2013, 25 Pages.
Kulkarni, et al., "Collaboratively Crowdsourcing Workflows with Turkomatic", In Proceedings of the ACM 2012 Conference on Computer Supported Cooperative Work, Feb. 11, 2012, pp. 1003-1012.
Kulkarni, et al., "Turkomatic: Automatic, Recursive Task and Workflow Design for Mechanical Turk", In Proceedings of Human Computation: Papers from Twenty-Fifth Conference on Artificial Intelligence, Aug. 7, 2011, pp. 91-96.
Lasecki, et al., "Information Extraction and Manipulation Threats in Crowd-Powered Systems", In Proceedings of the 17th ACM Conference on Computer Supported Cooperative Work & Social Computing, Feb. 15, 2014, 9 Pages.
Lasecki, et al., "Realtime Crowd Control of Existing Interfaces", In Proceedings of the 24th Annual ACM Symposium on User Interface Software and Technology, Oct. 16, 2011, 10 Pages.
Lasecki, et al., "Using Microtask Continuity to Improve Crowdsourcing", In Technical Report of Human-Computer Interaction Institute, Jan. 2014, 14 Pages.
Latoza, et al., "Microtask Programming: Building Software with a Crowd", In Proceedings of the 27th Annual ACM Symposium on User Interface Software and Technology, Oct. 5, 2014, 12 Pages.
Little, et al., "Exploring Iterative and Parallel Human Computation Processes", In Proceedings of the ACM Workshop on Human Computation, Jul. 25, 2010, pp. 68-76.
Mark, et al., "No Task Left Behind? Examining the Nature of Fragmented Work", In Proceedings of the SIGCHI Conference on Human Factors in Computing Systems, Apr. 2, 2005, pp. 321-330.
Martin, et al., "Being a Turku", In Proceedings of the 17th ACM Conference on Computer Supported Cooperative Work & Social Computing, Feb. 15, 2014, pp. 224-235.
Negri, et al., "Divide and Conquer: Crowdsourcing the Creation of Cross-Lingual Textual Entailment Corpora", In Proceedings of the Conference on Empirical Methods in Natural Language Processing. Association for Computational Linguistics, Jul. 27, 2011, pp. 670-679.
Neuwirth, et al., "Computer Support for Distributed Collaborative Writing: A Coordination Science Perspective", In Coordination Theory and Collaboration Technology, May 2000, 19 Pages.

(56) References Cited

OTHER PUBLICATIONS

Noel, et al., "Empirical Study on Collaborative Writing: What Do Co-authors Do, Use, and Like?", In Computer Supported Cooperative Work, vol. 13, Issue 1, Mar. 2004, pp. 63-89.
Posner, et al., "How People Write Together", In Proceedings of the Twenty-Fifth Hawaii International Conference on System Sciences, vol. 4, Jan. 7, 1992, 13 Pages.
Rzeszotarski, Jeffrey M., "Worker Collaboration in Crowdsourcing Markets", In Proceedings of ACM SIGCHI Workshop on Crowdsourcing and Human Computation, May 7, 2011, 4 Pages.
Sadauskas, et al., "Mining Memories: Designing a Platform to Support Social Media Based Writing", In Proceedings of the 33rd Annual ACM Conference on Human Factors in Computing Systems, Apr. 18, 2015, pp. 3691-3700.
Spring, Michael, "Collaborative Writing", Retrieved from <<http://www.sis.pitt.edu/~spring/cas/node31.html>>, Jan. 31, 1997, 3 Pages.
Tam, et al., "A Framework for Asynchronous Change Awareness in Collaborative Documents and Workspaces", In International Journal of Human-Computer Studies, vol. 64, Issue 7, Jul. 31, 2006, 29 Pages.
Teevan, et al., "Selfsourcing Personal Tasks", In Extended Abstracts on Human Factors in Computing Systems, Apr. 26, 2014, 6 Pages.
Terry, Lynn, "Productivity: Micro-Tasking and Multi-Tasking", Retrieved from <<hftp://www.clicknewz.com/5888/micro-tasking/>>, Jan. 3, 2013, 7 Pages.
Trafton, et al., "Preparing to Resume an Interrupted Task: Effects of Prospective Goal Encoding and Retrospective Rehearsal", In International Journal of Human-Computer Studies, vol. 58, Issue 5, May 2003, pp. 583-603.
Vaish, et al., "Twitch Crowdsourcing: Crowd Contributions in Short Bursts of Time", In Proceedings of the 32nd Annual ACM Conference on Human Factors in Computing Systems, Apr. 26, 2014, pp. 3645-3654.
Vul, et al., "Measuring the Crowd Within Probabilistic Representations Within Individuals", In Proceedings of Psychological Science, vol. 19, Issue 7, Jul. 2008, 3 Pages.
Wickens, Christopher D., "Multiple Resources and Performance Prediction", In Theoretical Issues in Ergonomics Science, vol. 3, Issue 2, Jan. 2002, 19 Pages.
Zacks, et al., "Perceiving, Remembering and Communicating Structure in Events", In Journal of Experimental Psychology: General, vol. 130, Issue 1, Mar. 2001, 1 Page.
Zhang, et al., "Human Computation Tasks with Global Constraints", In Proceedings of the SIGCHI Conference on Human Factors in Computing Systems, May 5, 2012, pp. 217-226.
"Non Final Office Action Issued in U.S. Appl. No. 14/880,305", dated Nov. 20, 2018, 19 Pages.
"Final Office Action Issued in U.S. Appl. No. 14/880,305", dated May 22, 2019, 26 Pages.

\* cited by examiner

PROVIDING REWARDS AND METRICS FOR COMPLETION OF MICROTASKS

CROSS-REFERENCE TO RELATED APPLICATIONS

This application is a continuation-in-part of U.S. application Ser. No. 14/880,305, titled "ASSIGNING AND IDENTIFYING MICROTASKS", and filed on Oct. 12, 2015, the disclosure of which is hereby incorporated in its entirety.

BACKGROUND

Complex tasks, such as writing an article or organizing a photo library, can be thought of as a set of multiple microtasks. A microtask is a task that can be easily completed in a short time frame with minimal background information or instruction. For example, a task such as writing a blog post may be thought of as a series of microtasks associated with creating each sentence or paragraph based on one or more topics or ideas, and additional microtasks associated with editing and/or proofing each created sentence or paragraph. The task of organizing the photo library may be similarly thought of as microtasks consisting of assigning tags to each photo of the photo library.

Rather than attempt to a complete an entire task at once, a user may attempt to complete the task by completing the microtasks associated with the task over some period of time. However, there is currently no way to easily determine the microtasks that make up a task for a user, to determine when the user is available to complete the microtasks, and to incentivize the user to complete the microtasks.

SUMMARY

Edits on a content item, such as a document, are divided into microtasks. The microtasks associated with a document can be automatically identified based on a workflow or can be identified by a user associated with the content item or an administrator. At a later time, the user can complete the microtasks for a content item using an application associated with their smart phone or tablet. The application may present the microtasks in a game-like environment where the user can compete with other users based on metrics such as number of microtasks completed in a day or fastest completion time. In addition, the user can earn rewards such as badges, coupons, or credits by completing microtasks. In this way, users can use time that would have been wasted playing games to complete their content items, while still experiencing some of the fun and competition associated with games.

In an implementation, a method for automatically completing identified microtasks using a prediction model and for updating the prediction model based on feedback is provided. The method includes receiving a document comprising a plurality of text portions by a computing device, identifying a workflow for the document by the computing device, identifying at least one microtask for at least one text portion of the plurality of text portions corresponding to the identified workflow by the computing device, completing the at least one microtask using a prediction model by the computing device, presenting a graphical indicator of the completed at least one microtask by the computing device, receiving an indication of acceptance or an indication of rejection of the completed at least one microtask by the computing device, and updating the prediction model based on the received indication of acceptance or indication of rejection by the computing device.

In an implementation, a method for incentivizing the completion of microtasks by providing one or more rewards is provided. The method includes presenting graphical indicators of one or more microtasks by a computing device, receiving a selection of one of the graphical indicators by the computing device, in response to the selection, providing the microtask corresponding to the selected graphical indicator for completion by the computing device, receiving results associated with the completion of the selected microtask and a metric for the selected microtask by the computing device, determining that the received results or the metric qualifies for at least one reward by the computing device, and providing a graphical indicator of the at least one reward by the computing device.

In an implementation, a system for presenting and completing microtasks is provided. The system includes at least one computing device and a microtask engine. The microtask engine is adapted to receive identifiers of a plurality of microtasks for a content item, present graphical indicators of one or more of the identified plurality of microtasks, receive a selection of one of the graphical indicators, in response to the selection, provide the microtask corresponding to the selected graphical indicator for completion, receive results associated with the completion of the selected microtask and a metric for the selected microtask, and provide the results and the metric for the provided microtask.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
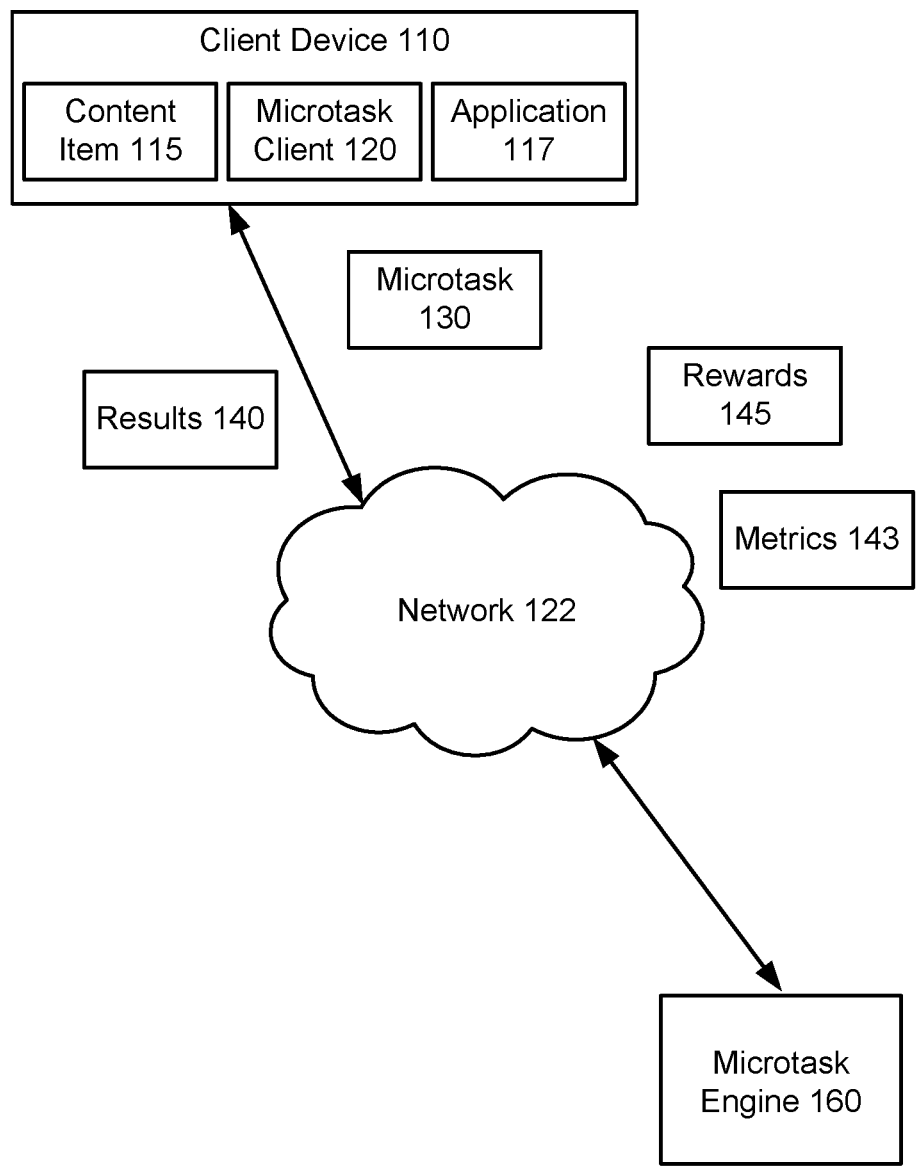
FIG. 1 is an illustration of an exemplary environment for identifying and completing microtasks, and for providing one or more rewards based on microtasks.

FIG. 1 is an illustration of an exemplary environment 100 for identifying and completing microtasks, and for providing one or more rewards based on microtasks. The environment 100 may include a microtask engine 160 and a client device 110 in communication through a network 122. The network 122 may be a variety of network types including the public switched telephone network (PSTN), a cellular telephone network, and a packet switched network (e.g., the Internet). Although only one client device 110 and one microtask engine 160 are shown in FIG. 1, there is no limit to the number of client devices 110 and microtask engines 160 that may be supported.

Figure 14:
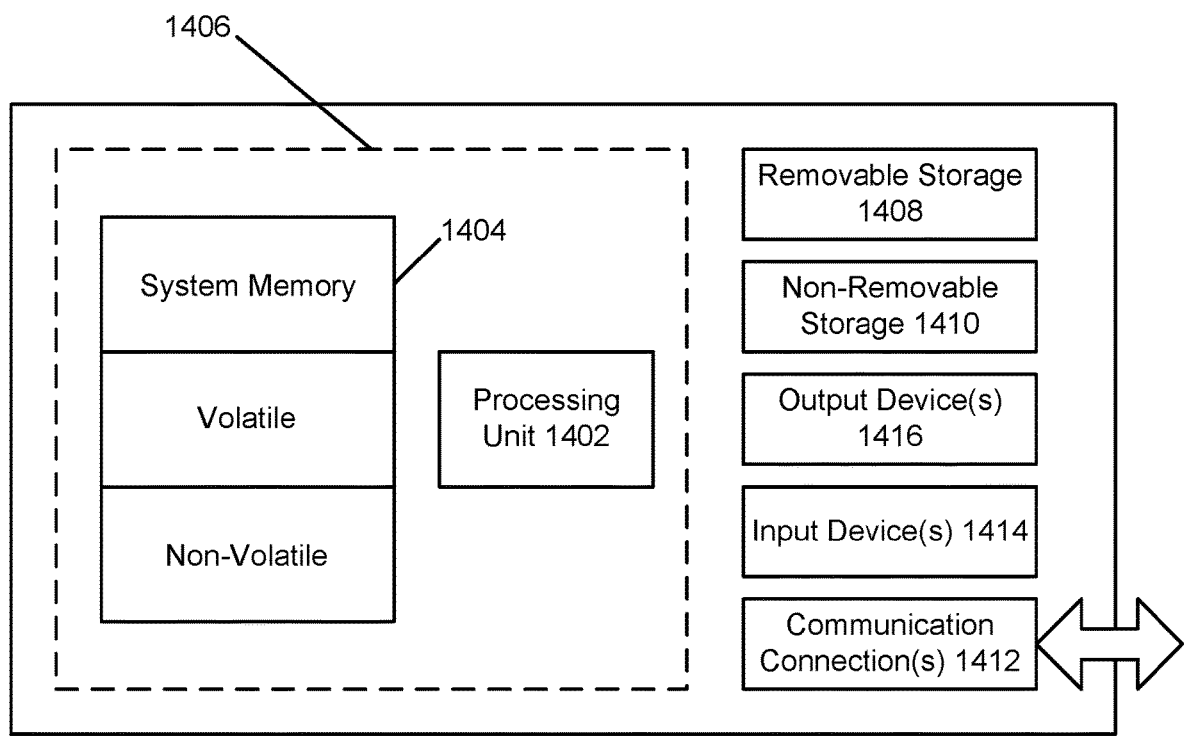
FIG. 14 shows an exemplary computing environment in which example embodiments and aspects may be implemented.

The client device 110 and the microtask engine 160 may be implemented using a variety of a variety of computing devices such as smart phones, desktop computers, laptop computers, tablets, and video game consoles. Other types of computing devices may be supported. A suitable computing device is illustrated in FIG. 14 as the computing device 1400.

An entity associated with the client device 110 may use the client device 110 to create, view, or edit one or more content items 115. The content items 115 may include files, documents, images, videos, music, applications or any other type of content that may be created, viewed, or edited using a computing device. Entities may include individuals (i.e., users), teams, collaborative groups, organizations, corporations, etc.

Users may create, view, and edit content items 115 using one or more applications 117. Examples of applications 117 may include word processing applications, web browsers, email applications, image and video editing applications, database applications, etc. Any type of application 117 that may create, view, and edit a content item 115 may be supported.

The client device 110 may further include a microtask client 120. The microtask client 120 may allow the user to identify and create one or more microtasks 130 from or based on tasks associated with content items 115. A microtask 130 as used herein is a task (e.g., a short task) that is involved in the creating, completion, or editing of a content item 115. A microtask 130 may not be atomic and may be further broken down into smaller microtasks 130.

Typically, a microtask 130 can be completed by a user in a time that is less than one to five minutes, although more or less time may be specified. In addition, a typical microtask 130 may be completed by a user without excessive context or other knowledge about the content item 115 associated with a microtask 130.

Depending on the implementation, a user may use the microtask client 120 to create one or more microtasks 130 for, or from, a task associated with a content item 115. In some implementations, potential microtasks 130 may be identified in the content item 115 automatically by the microtask client 120. For example, with respect to a task such as editing a content item 115, the microtask client 120 may identify one or more paragraphs of a document that include grammatical errors or that are too long. The microtask client 120 may prompt the user and/or creator associated with the document to create a microtask 130 directed to editing or shortening the identified paragraphs. The identified paragraphs may be displayed using a particular font, highlighting, or underlining that indicates to the entity that a microtask 130 is available. Depending on the implementation, the identified microtasks 130 may be presented to the user associated with the content item 115 for approval, or the microtasks 130 may be identified and created without user intervention.

In other implementations, the user may identify and/or select the particular microtasks 130 for a content item 115. For example, a user may highlight a sentence or paragraph in the content item 115. The user may provide an indication to create a microtask 130 based on the highlighted text.

Each microtask 130 may be associated with metadata. In some implementations, the metadata may include a type, an identifier of the content item 115 associated with the microtask 130, and an identifier of the user that owns or created the microtask 130. The type of microtask 130 may be a description of the work that is associated with the microtask 130. For example, where the content item 115 is a document, the type may be one or more of edit content, shorten content, or generate content. Where the content item 115 is an image, the type may be one or more of crop image, brighten image, filter image, or tag image. Other types of microtasks 130 may be supported. The metadata may further include data such as an estimated completion time for the microtask 130, and any rewards 145 associated with the completion of the microtask 130.

The metadata associated with a microtask 130 may further include or identify what is referred to herein as a workflow. A workflow may describe the sequence of steps or processes that are used to complete the associated microtask 130. Depending on the implementation, the workflows may be specified by the microtask client 120, for example.

As may be appreciated, by breaking up a task such as the creation or completion of a content item 115 into a plurality of microtasks 130, the speed at which the content item 115 can be created and/or completed by user may be increased. Another advantage of microtasks 130 is referred to herein as "selfsourcing." Selfsourcing refers to the process of assigning and/or presenting a microtask 130 to the user that created the microtasks 130 for completing when it is determined by the microtask client 120 that the user is available to perform the microtask 130.

In some implementations, the microtask client 120 may present a microtask 130 for completion to a user when the user logs into their client device 110, when the user switches tasks, when it is determined that the user is not being productive (e.g., browsing the Internet), or when it is determined that the user is waiting in line (e.g., using accelerometers, location sensors, or other sensors associated with the client device 110), for example. As may be appreciated, selfsourcing may allow a user to capture time that may have been otherwise been lost, and to use the captured time to work towards the completion of a content item 115.

In another implementation, the microtask client 120 may be integrated into an application 117 such as a game to encourage the user to complete microtasks 130. In one example, the game application 117 may maintain leaderboards where users can compete with other users through metrics 143 such as the number of microtasks 130 that they have completed in a day, week, month, etc. Other metrics 143 such how long the user takes to complete a microtask 130 can be used. In addition, the game application can provide rewards 145 for completing microtasks or reaching microtask-based milestone (e.g., complete one hundred microtasks 130). Example rewards 145 include badges, coupons, credits that can be redeemed for application 117 purchases, or "add-free" use of an application 117. Other types of rewards 145 may be used.

To help facilitate selfsourcing, the environment 100 may further include the microtask engine 160. The microtask engine 160 may receive one or more microtasks 130 in a content item 115 associated with a user, and may present the microtasks 130 for completion by the user at some other time. For example, the microtask engine 160 may present one or more of the microtasks 130 to the user in a game application 117 as described above.

After the user completes a microtask 130, the microtask engine 160 may receive results 140 from the user. The contents of the results 140 may depend on the type of microtask 130. For example, where the microtask 130 was editing a paragraph, the results 140 may include the edited paragraph by the user. The microtask engine 160 may provide the generated results 140 to the microtask client 120 associated with the content item 115 where the results 140 may be incorporated into the content item 115 and/or submitted to the user for further approval.

The microtask engine 160 may further calculate one or more metrics 143 for the user based on microtask 130 completion, and may provide some or all of the calculated metrics 143 to the microtask client 120 where they may be displayed to the user. The metrics 143 may be specific to the user (i.e., number of microtasks 130 completed today, total number of microtasks 130 completed, number of microtasks 130 remaining, and average (e.g., mean, median, mode, etc.) microtask 130 completion time), or may be based on multiple users (i.e., top performing user today, top performing all time user, user with fastest microtask completion time, and a general ranking of the users). By viewing the metrics 143, the user may be incentivized to complete more microtasks.

Figure 2:
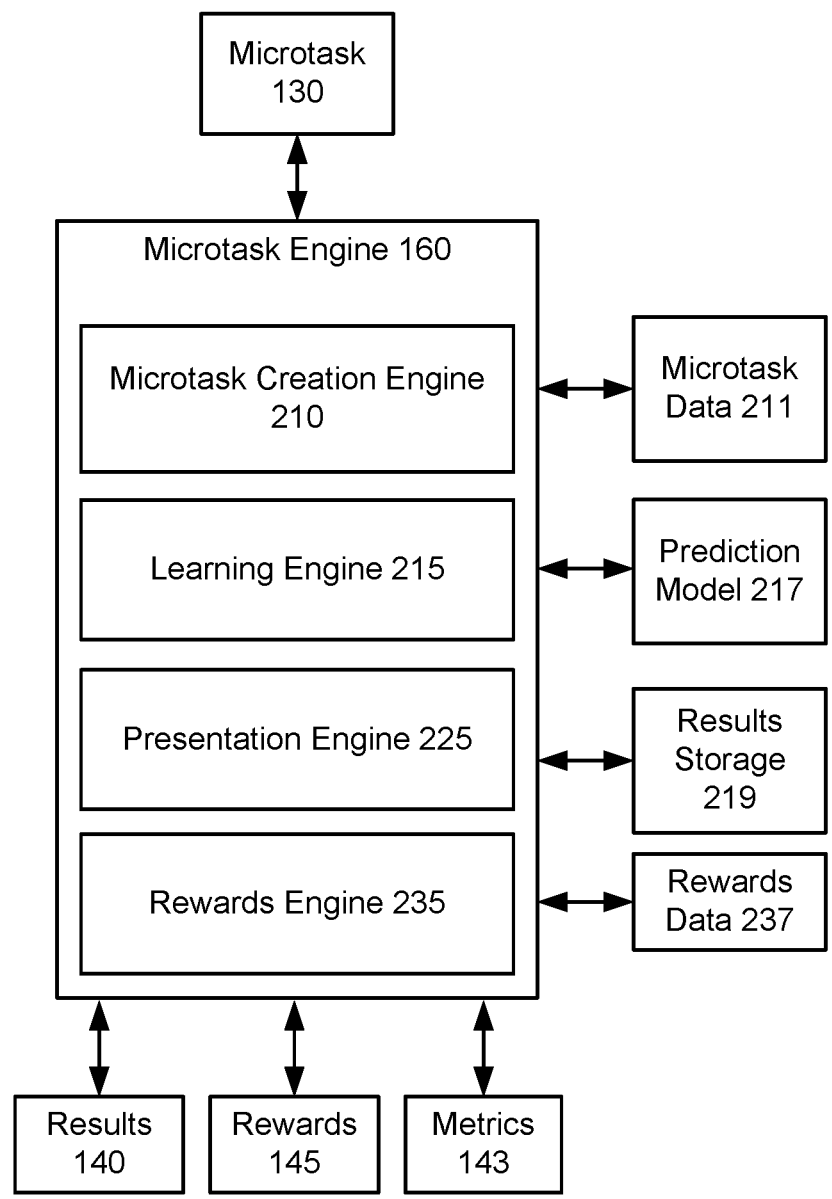
FIG. 2 is an illustration of an implementation of an exemplary microtask engine.

FIG. 2 is an illustration of an implementation of an exemplary microtask engine 160. The microtask engine 160 may include one or more components including a microtask creation engine 210, a learning engine 215, a presentation engine 225, and a rewards engine 235. More or fewer components may be included in the microtask engine 160. Some or all of the components of the microtask engine 160 may be implemented by one or more computing devices such as the computing device 1400 described with respect to FIG. 14. In addition, some or all of the components of the microtask engine 160 may be implemented as part of the microtask client 120.

The microtask creation engine 210 may allow for the creation and/or identification of microtasks 130 with respect to a content item 115. In some implementations, the microtask creation engine 210 may automatically identify potential microtasks 130 with respect to a content item 110 by identifying aspects or portions of the content item 115 that are unfinished. The microtask creation engine 210 may identify microtasks 130 in the content item 115 by matching patterns associated with microtasks 130 against the text or contents of the content item 115.

In some implementations, the microtask creation engine 210 may identify microtasks 130 using one or more workflows. The workflow may be selected or identified by a user or an administrator based on the type of content item 115 that they are working on. For example, where a content item 115 is a document, the user creating the document may select a workflow related to editing the document. The microtask creation engine 210 may identify microtasks 130 within the document that are associated with the workflow of editing the document such as shortening paragraphs, editing paragraphs, correcting grammatical errors, etc. In another example, where the content item 115 is an image database, the user may select a workflow related to tagging photos, a workflow related to enhancing photos, or a workflow related to culling or deleting photos. Depending on which workflow is selected, the microtask creation engine 210 may identity images that are not tagged or enhanced as possible microtasks 130. In other implementations, the user associated with the content item 115 may identify potential microtasks 130 in the content item 115.

The microtask creation engine 210 may display indicators to the user associated with the identified one or more microtasks 130. Where the content item 115 is a document, the portions of the document that are identified as possible microtasks 130 may be underlined or displayed using a different color or font to indicate to the user that microtasks 130 are available. Other types of indications may be used. Alternatively or additionally, a window or other type of user interface element may be displayed that indicates to the user the microtasks 130 that have been identified in the content item 115.

The microtask creation engine 210 may receive a request to create a microtask 130 from a user. The request may correspond to one of the potential microtasks 130 automatically identified by the microtask creation engine 210 using the workflow. Alternatively, the request may correspond to a microtask 130 identified by the user.

The requested microtask 130 may include metadata that identifies various characteristics of the requested microtask 130 such as the type of microtask, the associated user, and the associated content item 115. The metadata may further include information such as a desired completion date, any rewards 145 associated with the microtask 130, and may indicate an estimated completion time for the microtask 130. The estimated completion time and/or rewards 145 may be used by the microtask engine 160 when selecting a microtask 130 for a microtask 130 focused game or application 117.

Depending on the implementation, the metadata associated with the microtask 130 may also be defined by a workflow associated with the microtask 130. As described above, some microtasks 130 may have an associated workflow that includes the steps or processes that may be performed to complete the microtask 130. Examples of metadata that may be defined by the workflow may be the estimated completion time or reward 145 information. Other types of metadata may be defined by the workflow associated with the microtask 130. Depending on the implementation, the microtask creation engine 210 may receive the workflow associated with the microtask 130 from the microtask client 120, or may retrieve the stored workflow for the microtask 130 from microtask data 211.

The microtask creation engine 210 may store microtasks 130 that are created along with the associated metadata in the microtask data 211. Depending on the implementation, the stored microtasks 130 may include the date that they were created and a date that they may be completed by. Other information may be included.

The learning engine 215 may automatically complete some or all of the microtasks 130 for a user using a prediction model 217. Depending on the implementation, the prediction model 217 may be created and/or maintained by the learning engine 215 by observing the results 140 generated by the user for a variety of microtasks 130. Any method or technique for generating a prediction model 217 based on user behavior may be used.

The learning engine 215 may generate results 140 for a microtask 130 using the prediction model 217. After generating the results 140, the learning engine 215 may present the results 140 for approval by the user. The microtask client 120 may present the generated results 140 to the user in an application 117, and may ask the user if the user accepts the proposed results 140. For example, where the microtask 130 is to shorten a paragraph, the learning engine 215 may present the original paragraph to the user along with the results 140 that include the shortened paragraph.

The user may provide feedback with respect to the proposed results 140. For example, the user may either accept or reject the proposed results 140, or may alternatively provide new results 140 to replace the results 140 proposed by the learning engine 215. The learning engine 215 may update the prediction model 217 using the feedback. For example, if the user accepts the results 140, the learning engine 215 may generate a positive or reinforcing signal to the prediction model 217 with respect to the generated results 140, and if the user rejects the results 140, the learning engine 215 may generate a negative signal to the prediction model 217 with respect to the generated results 140. Any method or technique for machine learning may be used.

Depending on the implementation, when automatically completing microtasks 130 and generating results 140, the learning engine 215 may generate multiple results 140 and may present the multiple results 140 as options to the user associated with the microtask 130. For example, where the microtask 130 is to shorten a paragraph, the learning engine 215 may generate four different possible shortened paragraphs and the user may select the shortened paragraph that they prefer. The selected paragraph (and the not selected paragraphs) may be used as feedback to improve the prediction model 217.

The presentation engine 225 may determine when the user is available to receive a microtask 130, and may select the microtask(s) 130 that are presented to the user. In some implementations, the user may indicate certain conditions as to when they would like to perform microtasks 130, and the presentation engine 225 may provide microtasks 130 when the conditions are met.

For example, the user may indicate that they would like to receive microtasks when they are waiting in line, after they have closed or are waiting on a particular application 117, after they have logged in to a particular client device 110, when they are commuting (e.g., on a train), or when they are wasting time. In addition, the user may also specify conditions that are based the time of day or which client device 110 they are using (e.g., "never receive microtasks 130 when using a work computer," and "receive microtasks 130 when using a laptop on the weekend").

In some implementations, the presentation engine 225 may present microtasks to the user when the user has begun to use an application 117 associated with completing microtasks 130. As described previously, a user may use a game or other application 117 that tracks how many microtasks 130 the user has completed, and compares the performance of the user to other users using one or more metrics 143. The users may be compared based on information such as total microtasks 130 completed, remaining microtasks 130 to complete, average microtask 130 completion time, etc.

Depending on the implementation, when the user opens the application 117 for completing microtasks 130, the presentation engine 225 may select microtasks 130 for the user to complete from the microtask data 211. The selected microtasks 130 may include microtasks 130 associated with a particular content item 115, or may include some or all of the microtasks 130 associated with the user. The particular content item 115 may be specified or selected by the user using the application 117.

The microtasks 130 may be presented to the user by the presentation engine 225 in a way as to encourage the user to complete the microtasks 130. For example, where there are few microtasks 130 remaining for a content item 115, graphical indicators of the remaining microtasks 130 for the content item 115 may be displayed in a prominent position on the application 117 along with an indication of the number of microtask 130 that remain to be completed. In another example, the graphical indicators of the microtasks 130 may be displayed along with estimations of how long the corresponding microtasks 130 may take to complete, allowing the user to select a microtask 130 that can be completed in whatever time the user had allotted to performing microtasks 130 today.

The presentation engine 225 may, for each microtask 130 completed by the user, receive results 140 and a metric 143. The results 140 and the metric 143 may be stored by the presentation engine 225 in the results storage 219. In an implementation, the metric 143 for a microtask 130 may be a completion time for the microtask 130. Depending on the implementation, the results 140 in the results storage 219 may be automatically incorporated into the associated content item 115, or may be sent to the user for approval before being incorporated. Where the results 140 are approved, the act of approving or accepting a particular result 140 may be considered a microtask 130 for the user, and may be selected and presented by the presentation engine 225 as described above.

In some implementations, each microtask 130 may be completed by the user once. In other implementations, some microtasks 130 may be completed by the user multiple times. Depending on the implementation, where the user completes a microtask 130 multiple times, the results 140 and/or metric 143 from each completion may be presented to the user, and the user may be asked to select the best results 140. Alternatively or additionally, the microtask engine 160 may automatically select the best results 140 based on criteria specified by the workflow associated with the microtask 130 or using the prediction model 217, for example.

In some implementations, the presentation engine 225 may attempt to grade or measure the quality of the results 140 provided by the user for a microtask 130. The grade for the results 140 may be used by the presentation engine 225 to select a best set of results 140 as described above, to determine if the results 140 may be discarded by the presentation engine 225, and/or determine if the associated microtask 130 may be re-presented for completion by the presentation engine 225. For example, if the results 140 have numerous typographical or grammatical errors, the results 140 may receive a low grade and may be discarded. Other information indicative of low or high quality results 140 may be the amount of time that the user spent completing the microtask 130, and various signals that may indicate that the user was distracted while completing the microtask 130. For example, when the user completes the microtask 130 on a smart phone, there may be sensor data such as microphone data or camera data that indicates that the user was talking to someone while completing the microtask 130, or was performing another activity while completing the microtask 130. Other signals of distraction may be used.

The rewards engine 235 may calculate additional metrics 143 based on results 140 and metrics 143 stored in the results storage 219. The metrics 143 calculated for a user may include fastest completion time, average completion time, microtasks 130 completed today, this week, this month, etc., and microtasks 130 remaining for the user, for example. Any type of metric 143 or statistic related to the completion of tasks may be calculated. The metrics 143 related to completion types may be calculated across all microtasks 130 completed by the user, as well as for specific types of microtasks 130 completed by the user (i.e., "edit", "spelling", and "shorten"). The calculated metrics 143 may include "average" metrics 143 such as average completion time, or average number of microtasks 130 completed. Any type of average may be used such as mean, median, mode, etc. Depending on the implementation, the calculated average may be weighted to favor more recent metrics 143.

The rewards engine 235 may further calculate "global" metrics 143 using the metrics 143 completed for each user. These metrics may include the user who completed the most microtasks 130 today or all-time, the user having the fastest average completion time, and the user having the least microtasks remaining to be completed. These global metrics 143 may be provided by the rewards engine 235 to the microtask client 120 and/or application 117 and may be used to create a leaderboard where a user can compare their performance with other users. Depending on the implementation, when computing the global metrics 143 for a user, the rewards engine 235 may consider metrics 143 for all users of the application 117, or only a subset of the users of the application 117. For example, the rewards engine 235 may only consider users who have a social-networking relationship with the user when computing the global metrics 143.

The rewards engine 235 may determine if requirements for one or more rewards 145 have been met by a user. Each reward 145 may be associated with one or more requirements that control how the reward 145 may be earned by a user. Example requirements may be microtask 130 specific e.g., complete this microtask 130 and receive this reward 145), may be cumulative (e.g., complete one hundred microtasks), or may be based on certain metrics 143 (e.g., complete ten microtasks 130 in one day, or achieve a completion time in the top ten percent of all completion times). The requirements for a reward 145 may be set by a user or an administrator, and may be stored in rewards data 237. Alternatively or additionally, the requirements for a reward 145 may include in the metadata or workflow associated with a microtask 130.

The rewards engine 235 may provide any rewards 140 earned by a user to the microtask client 120 and/or application 117 when the user may view and/or redeem the rewards 140. In addition, any rewards 145 earned by the user may be stored in the rewards data 237. Examples of rewards 145 include graphical badges or achievements that may be displayed in a user profile associated with a user, credits towards the purchase or download or another application 117, ad-free usage of an application 117, or "time" credits towards the use of other applications 117. For example, if a user spends ten minutes performing microtasks 130, they may receive a reward 145 that provides them with twenty minutes to use a web browser or video game application 117. Other types of rewards 145 may be used.

Figure 3:
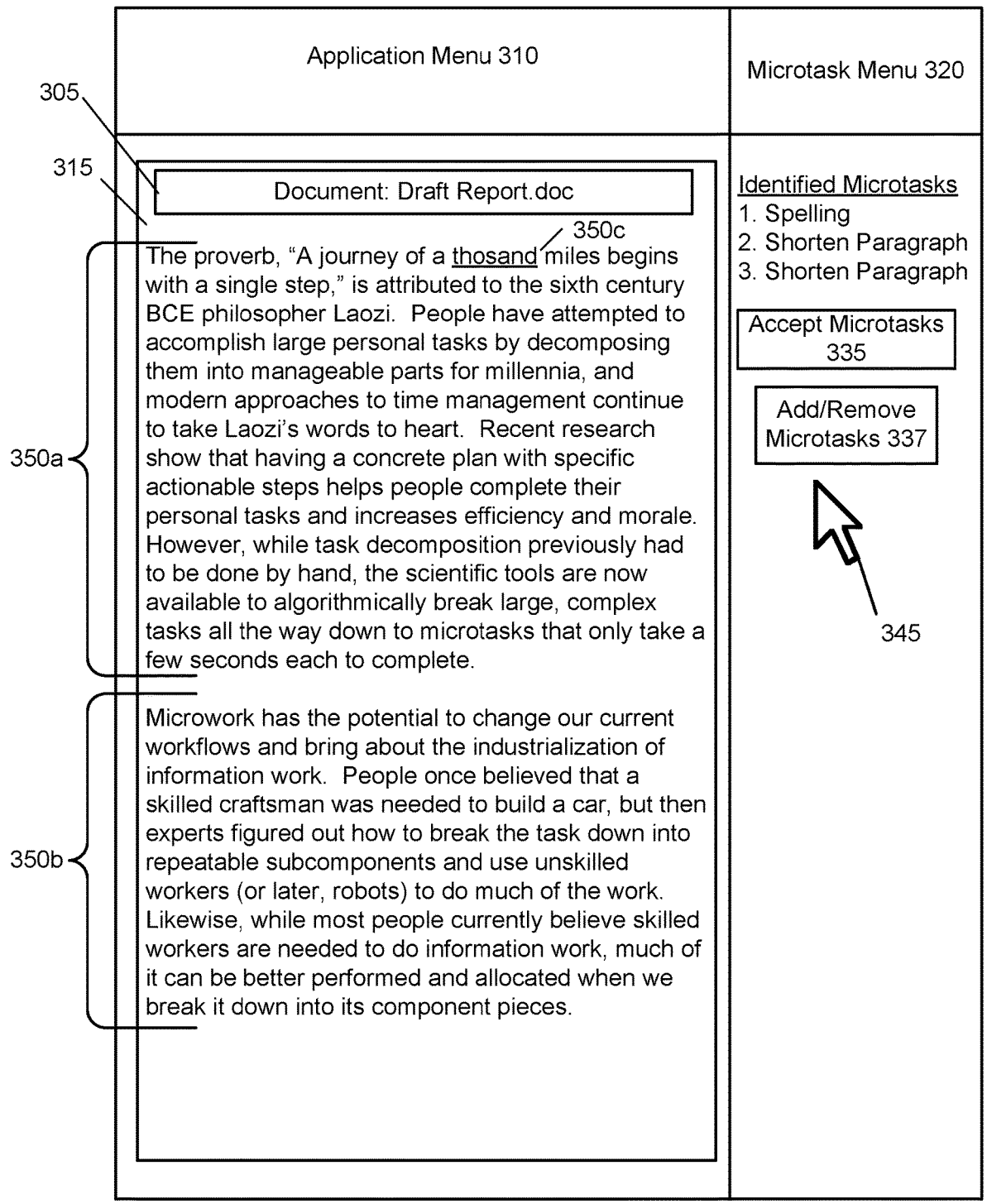
FIG. 3 is an illustration of an example user interface for identifying and/or creating microtasks.

FIG. 3 is an illustration of an example user interface 300 for identifying and/or creating microtasks 130. The user interface 300 may be generated and presented to a user at a client device 110 such as a desktop computer, a laptop computer, or any portable or handheld computing device. The user interface 300 includes an application menu 310 and a content window 315. The application menu 310 and the content window 315 may be part of a content item creation application 117. In the example shown, the application 117 may be a document editing application such as a word processing application. The user may enter and edit text for the content item 115 into the content window 315.

To incorporate microtasks 130 into the application 117, the user interface 300 may include a microtask menu 320. The microtask menu 320 may allow the user to select workflows, create microtasks 130, and set various options related to the microtasks 130, from within the application 117 as they create the content item 115. Depending on the implementation, the microtask menu 320, and the functionality associated with the microtask menu 320, may be provided by the microtask client 120 and/or the microtask engine 160.

As shown in a title window 305, the user has created and/or opened a content item 115 titled "Draft Report.doc." The user has created two paragraphs of text for the content item 115 in the content window 315. After the user entered the paragraphs, the microtask creation engine 210 identified three microtasks 130 in the content window 315. The microtasks 130 may have been identified automatically without user action based on workflows associated with the microtasks 130, or may have been identified in response to the user selecting a button or other user interface element.

In the example shown, the identified microtasks 130 are displayed to the user in the microtask menu 320. In particular, the microtask creation engine 210 identified a "Spelling" microtask 130 for the misspelled word "thosand" at 350c, and identified two "Shorten Paragraph" microtasks 130 at 350a and 350b respectively.

After viewing the identified microtasks 130 in the microtask menu 320, the user may choose to accept the identified microtasks 130 using a pointer 345 to select a user interface element 335 labeled "Accept Microtasks". Alternatively, the user may choose to add or remove microtasks 130 from those microtasks 130 identified in the microtask menu 320 by using the pointer 345 to select a user interface element 337 labeled "Add/Remove Microtasks". After the user has accepted the microtasks 130 in the microtask menu 320, the microtask creation engine 210 may create the corresponding microtasks 130, and may associate the microtasks 130 with the content item 115 "Draft Report.doc".

Figure 4:
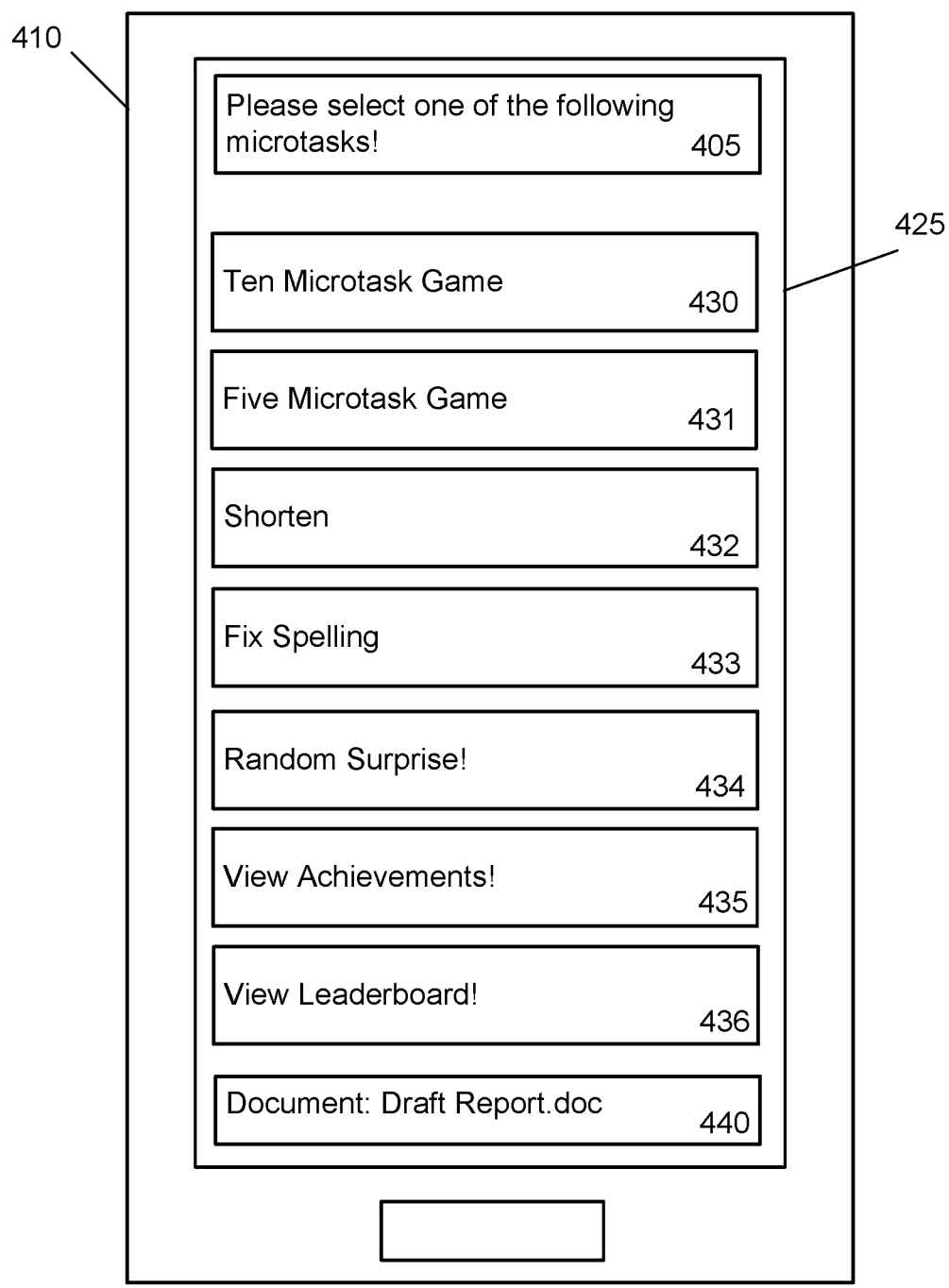
FIG. 4 is an illustration of an example user interface for selecting microtasks.

FIG. 4 is an illustration of an example user interface 400 through which a user may complete one or more microtasks 130. The user interface 400 may be implemented by a smart phone 410 for example, although other types of client devices 110 may be used. The user interface 400 may be part of an application 117 such as a game that encourages the user to complete microtasks 130.

Continuing the above example, the microtask client 120 may have determined that user is available to complete one or more microtasks 130, and may have launched the application 117 on the client device 110 associated with the user. For example, using a global positioning system (GPS) (or other sensor) associated with the smart phone 410, the microtask client 120 may have determined that the user is waiting in line at a store and may have requested a microtask 130 to complete. Alternatively, the user may have selected an icon or other user interface element on the smart phone 410 to launch the application 117.

As shown, the application 117 displays numerous user interface elements in a window 425 to the user that allow the user to select microtasks 130 to complete, allow the user to compare their performance against other users of the application 117 (i.e., metrics 143), and allow the user view any rewards 145 or other incentives that the user may have earned by performing microtasks 130.

The window 425 includes a user interface element 440 through which the user may select the particular content item 115 whose associated microtasks 130 the user would like to complete. In the example shown, the user has chosen to complete microtasks 130 corresponding to the content item 115 "Draft Report.doc".

The window 425 further includes user interface elements 432 and 433 that correspond to particular types of microtasks 130 that are associated with the content item 115 identified in the user interface element 440. The user interface element 432 labeled "Shorten" allows the user to perform the "Shorten Paragraph" microtasks 130 identified for the paragraphs 350a and 350b at FIG. 3. Similarly, the user interface element 433 labeled "Fix Spelling" allows the user to perform the "Spelling" microtask 130 identified for the word 350c. The user interface element 434 labeled "Random Surprise" allows the user to receive and complete a microtask 130 that is randomly selected by the application 117.

The window 425 includes other user interface elements that may correspond to custom selections or series of microtasks 130. The user interface element 430 labeled "Ten Microtask Game" allows the user to receive and perform a sequence of ten microtasks 130. Similarly, the user interface element 431 labeled "Five Microtask Game" allows the user to receive and perform a sequence of five microtasks 130. Depending on the implementation, the microtasks 130 in each sequence may be randomly selected, or may be selected such that there is a microtask 130 corresponding to particular types of microtasks 130 in each sequence. For example, the presentation engine 225 may select the sequence of microtasks 130 such that at least one microtask of the types "spelling", "shorten", "edit" and "review" are included. In another example, the presentation engine 225 may select the sequence of microtasks 130 such that the cumulative expected time to complete the sequence of microtasks 130 is within some range.

As described previously, one benefit of the microtask engine 160 is inspiring users to complete microtasks 130 by comparing their microtask performance with other users through metrics 143, and also providing various rewards 145 to the users to complete microtasks 130. In the example shown, the user may compare their personal microtask performance against other users by selecting the user interface element 436 labeled "View Leaderboard!". Examples of metrics 143 that may be used to compare users may include average microtask 130 completion time, microtask 130 completion rate (i.e., number of microtasks completed per hour, per day, per week, etc.), and remaining number of microtasks 130 for each content item 115 associated with the user.

In the example shown, the user may view the various rewards 145 and other incentives that the user has accrued performing microtasks 130 be selecting the user interface element 435 labeled "View Achievements!." Examples of rewards 145 that may be displayed include badges or other graphics that indicate certain microtask 130 related milestones such as "completed ten microtasks", "completed fifty microtasks", etc. Other rewards 145 such as coupons, gift certificates, free application 117 downloads or credits, may also be redeemed or displayed.

Figure 5:
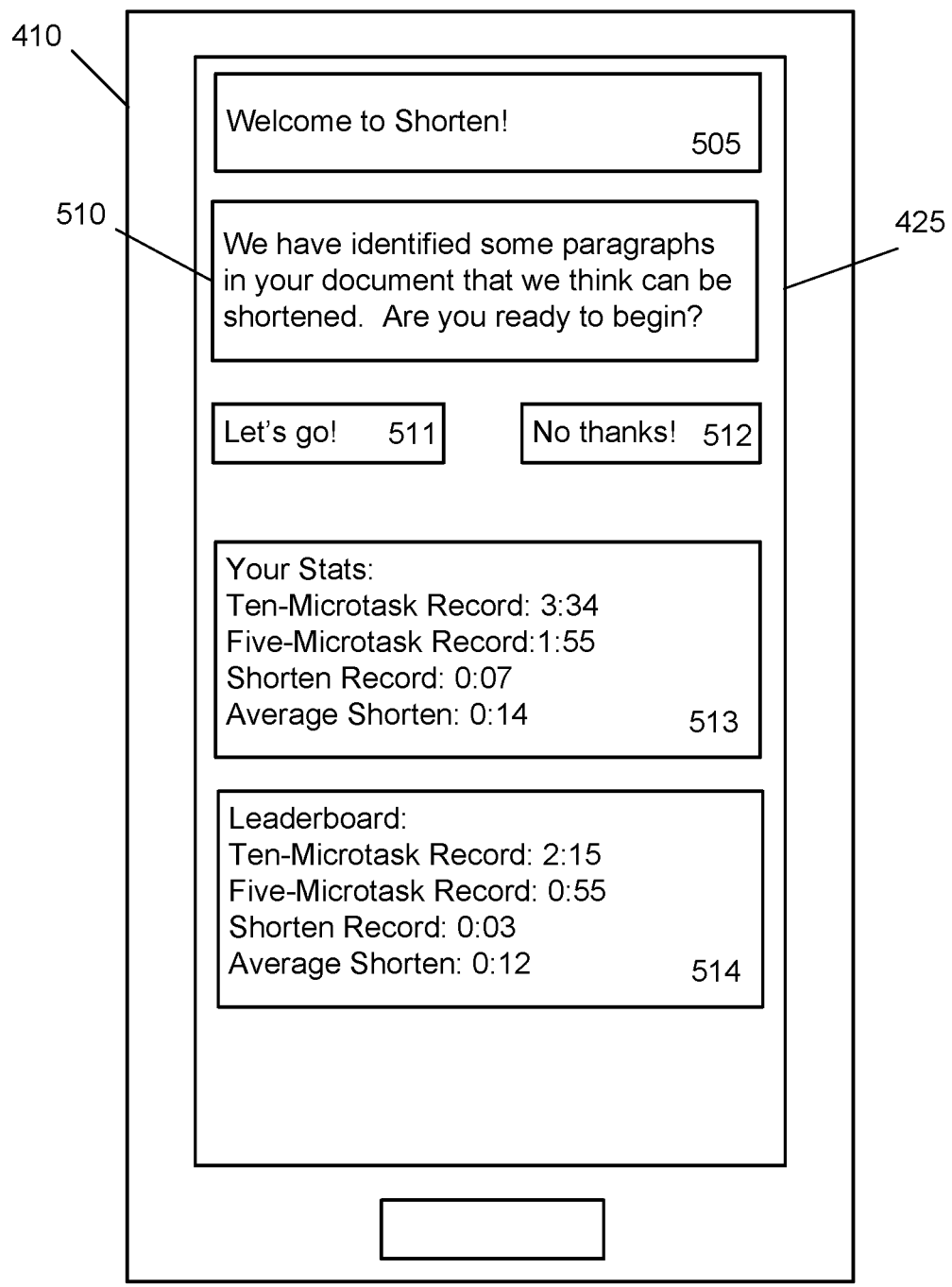
FIG. 5 is an illustration of another example user interface for selecting microtasks.

Continuing to the user interface 500 of FIG. 5, the user has selected the user interface element 432 to perform a microtask 130 of the type "shorten". Accordingly, the user interface 500 has been displayed corresponding to the selected microtask 130. The content window 425 has been revised to include the window 505 that tells the user the type of microtask 130 they selected, and a window 510 that provides instructions or other content that may be needed by the user to complete the microtask 130. If the user is ready to perform the microtask 130, they may select a user interface element 511 labeled "Let's go!". Alternatively, if the user does not wish to perform the microtask 130, they can select the user interface element 512 labeled "No thanks!".

In addition, other information is displayed to the user in the window 425. In the example shown, personal microtask related metrics 143 are displayed to the user in a window 513 labeled "Your Stats." Also shown in a window 514 labeled "Leaderboard" are various microtask related metrics 143 for all of the users that use the application 117. Alternatively, the metrics 143 in the window 514 may be limited to friends of the user, or users that are geographically close to the user, for example.

Figure 6:
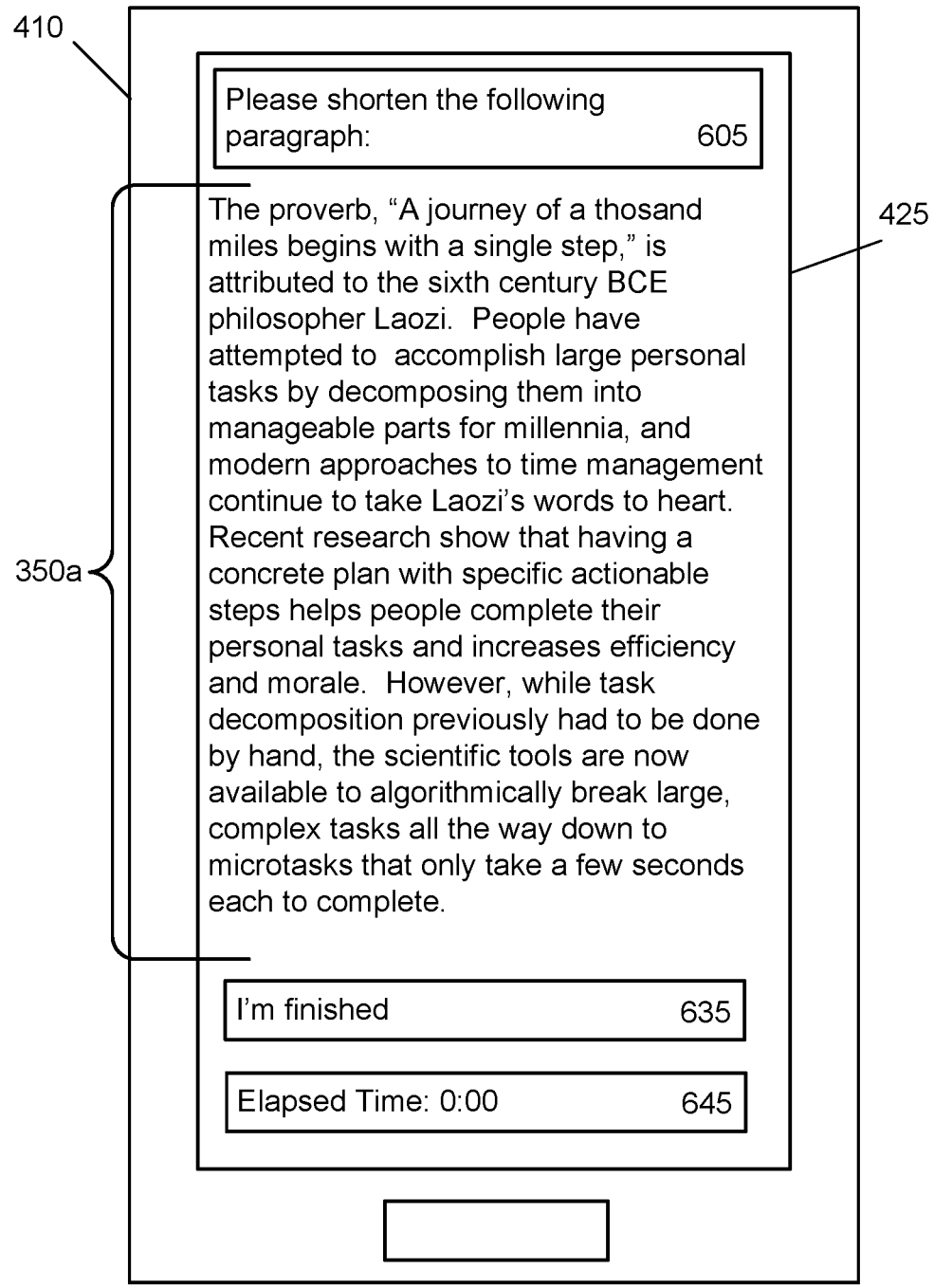
FIG. 6 is an illustration of another example user interface for completing microtasks.

Continuing to the user interface 600 of FIG. 6, the user has selected the user interface element 511, and the content window 425 has been updated to include the microtask 130. As shown, instructions to complete the microtask 130 are displayed to the user in a window 605, and the paragraph 350a corresponding to the selected microtask 130 is displayed to the user in the window 425. The user may begin to shorten the paragraph 350a using whatever editing tools are provided by application 117 and/or smart phone 410. For purposes of incentivizing the user through rewards 145 and/or metrics 143, the window 425 also includes a running clock showing the amount of time that the user has spent working on the microtask 130. This clock is shown in a window 645 labeled "Elapsed Time." Other completion metrics may be displayed.

Figure 7:
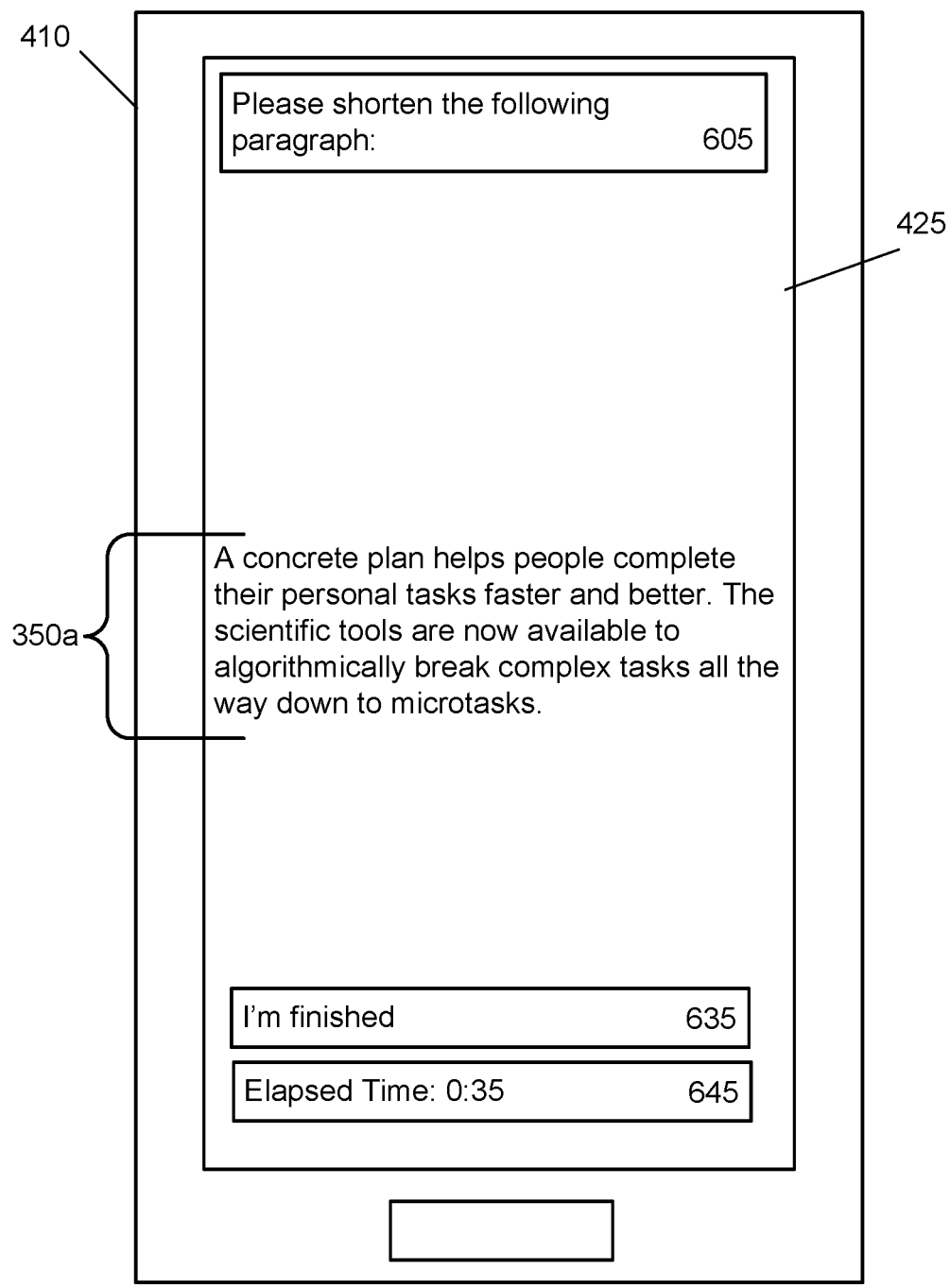
FIG. 7 is an illustration of another example user interface showing a microtask that has been completed.

Continuing to the user interface 700 of FIG. 7, the user has completed the microtask 130 and has shortened the paragraph 350a in the content window 425. After completing the microtask 130, the user may submit the shortened paragraph as the results 140 by selecting the user interface element 635 labeled "I'm finished." In response, the microtask client 120 may provide the results 140 to the microtask engine 160, along with the elapsed time from the window 645. Alternatively, or additionally, the microtask client 120 may incorporate the results 140 into the content item 115 associated with the microtask 130.

Figure 8:
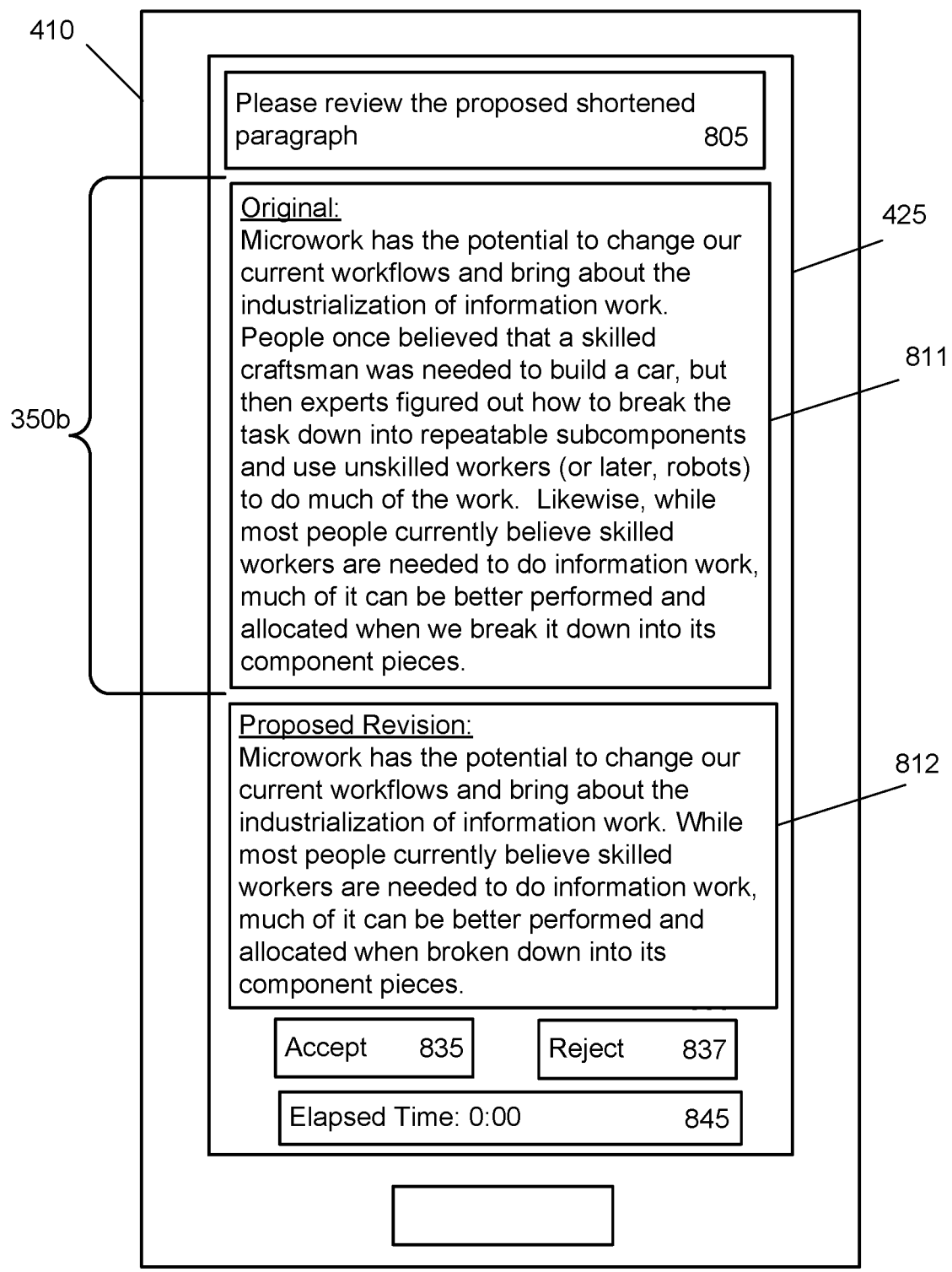
FIG. 8 is an illustration of another example user interface for accepting or rejecting a microtask that has automatically been completed.

After completing the microtask 130, the user may return to the user interface 300 of FIG. 3 to select another microtask 130, or may be automatically presented with another microtask 130 by the application 117. In the example shown in the user interface 800 of FIG. 8, the user has been presented with a microtask 130 corresponding to the paragraph 350b. In contrast with the previous microtask 130, in this example, the learning engine 215 has already completed the microtask 130, and is asking the user to approve of the generated results 140. Accordingly, the window 425 includes a window 805 with instructions for the user to approve of the shortened paragraph.

In a window 811, the original paragraph 350b is displayed to the user, and in a window 812, the proposed shorted paragraph is displayed to the user. The user may either accept or reject the shorted paragraph of the window 812 by selecting either the user interface element 835 or the user interface element 837, respectively. Similar to the previous microtask 130, the time that the user takes to make the selection is tracked in a window 845. If the user accepts the shorted paragraph, the microtask client 120 may provide the results 140 to the microtask engine 160, along with the elapsed time in the window 845.

Figure 9:
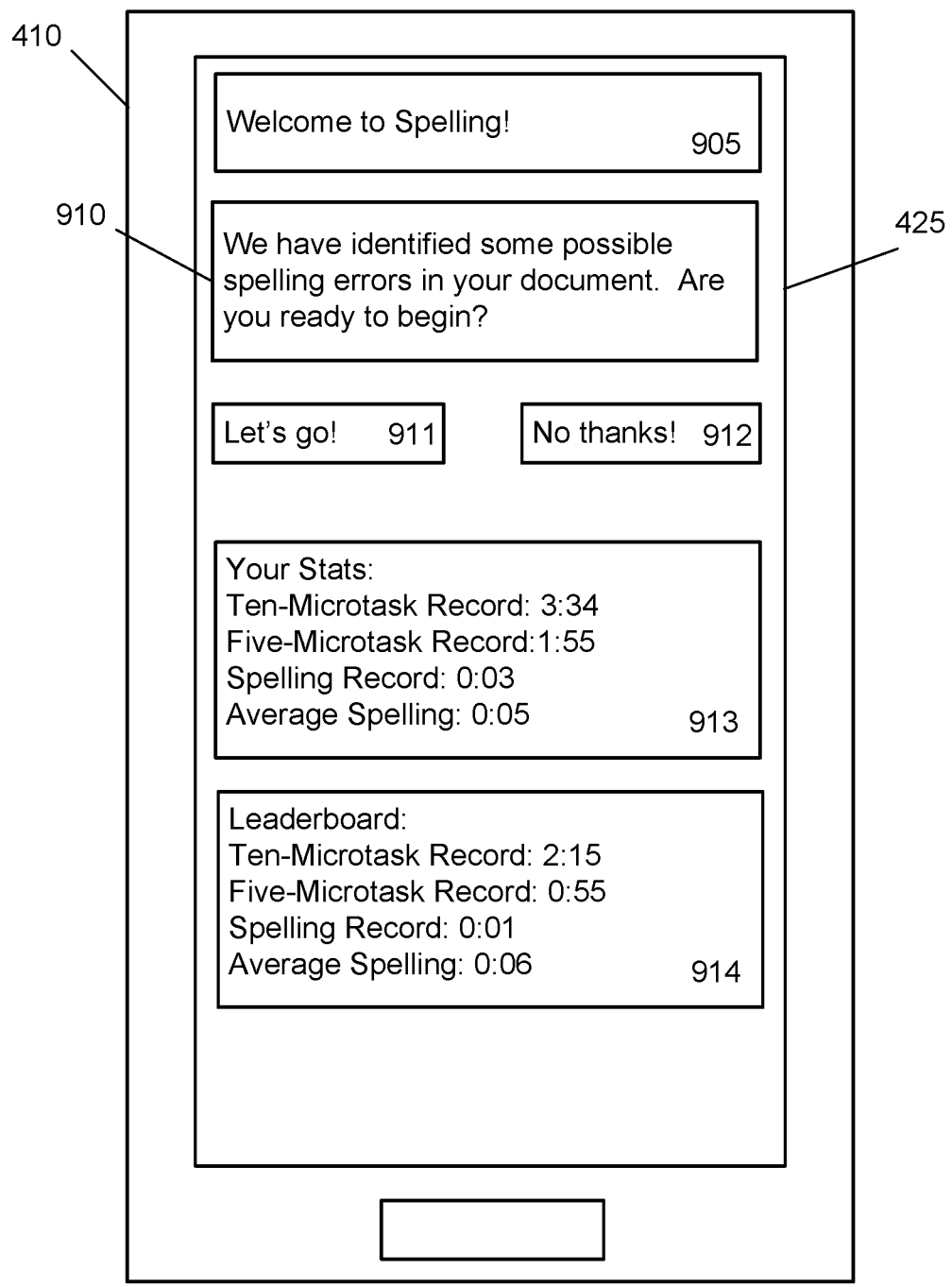
FIG. 9 is an illustration of another example user interface for selecting microtasks.

After completing the microtask 130, the user may return to the user interface 300 of FIG. 3 to select another microtask 130. Continuing the previous example, the user has selected the user interface element 433 labeled "Fix Spelling." Accordingly, FIG. 9 displays an illustration of an example user interface 900 for the microtask 130 corresponding to the misspelled word 350*c*. The content window 425 has been revised to include a window 905 that tells the user the type of microtask 130 they selected, and a window 910 that provides instructions or other content that may be needed by the user to complete the microtask 130. If the user is ready to perform the microtask 130, they may select a user interface element 911 labeled "Let's go!". Alternatively, if the user does not wish to perform the microtask 130, they can select the user interface element 912 labeled "No Thanks!". Similar to the user interface 500, the user interface 900 also includes various statistics and leaderboard information in windows 913 and 914 respectively.

Figure 10:
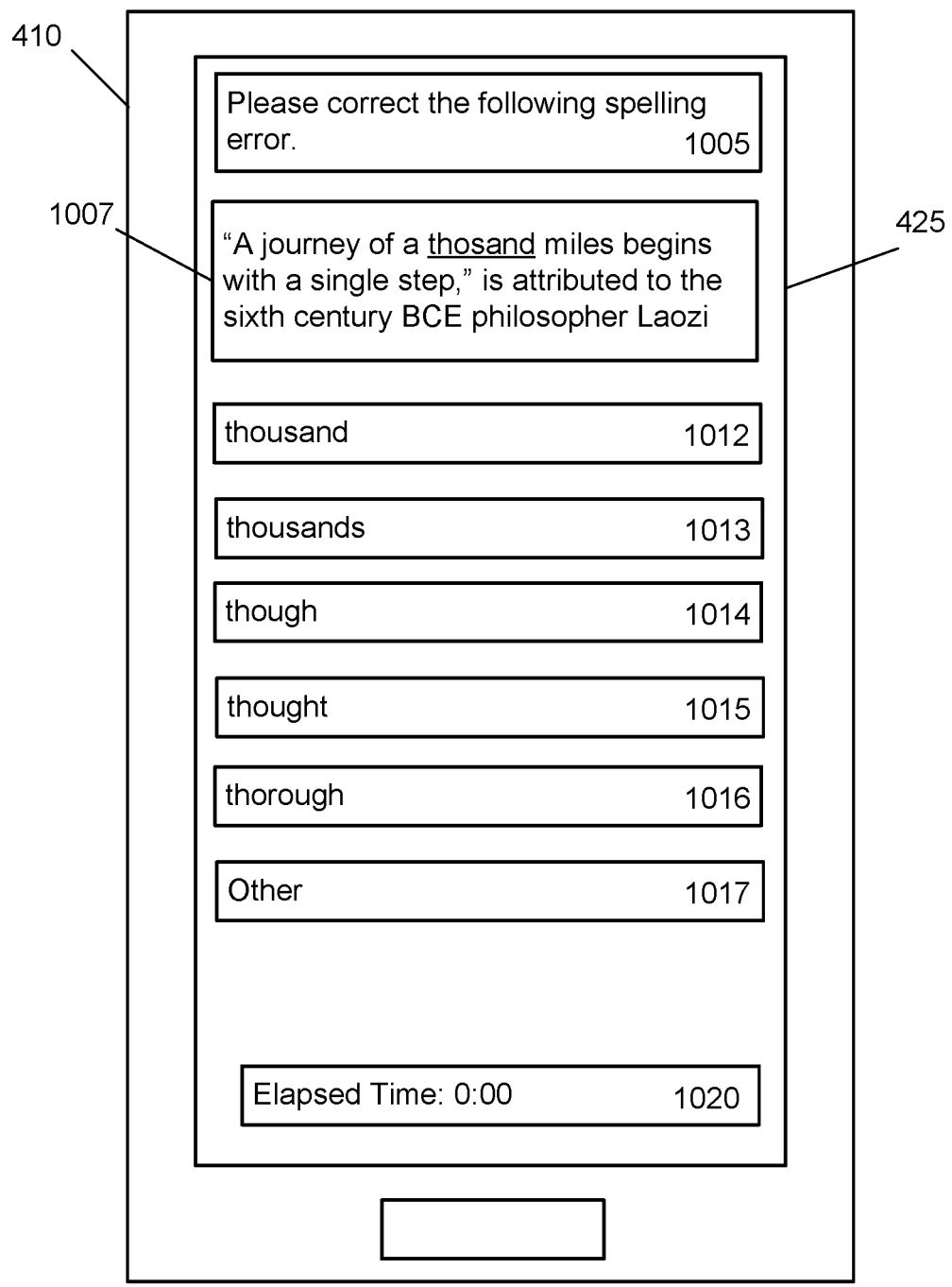
FIG. 10 is an illustration of another example user interface for completing microtasks.

Continuing to FIG. 10, the user has selected the user interface element 911, and the content window 425 has been updated to include the microtask 130. As shown, instructions to complete the microtask 130 are displayed to the user in a window 1005, and a sentence from the content item 115 that includes the misspelled word 350*c* is displayed to the user in a window 1007 for context. Also displayed in user interface elements 1012, 1013, 1014, 1015, and 1016 are suggestions of what the microtask engine 160 determined may be the correctly spelled version of the word 350*c*. In addition, a user interface element 1017 labeled "Other" is displayed to allow the user to enter a word other than those represented by the user interface elements 1012-1016. To complete the microtask 130, the user may select one of the user interface elements 1012-1017.

Figure 11:
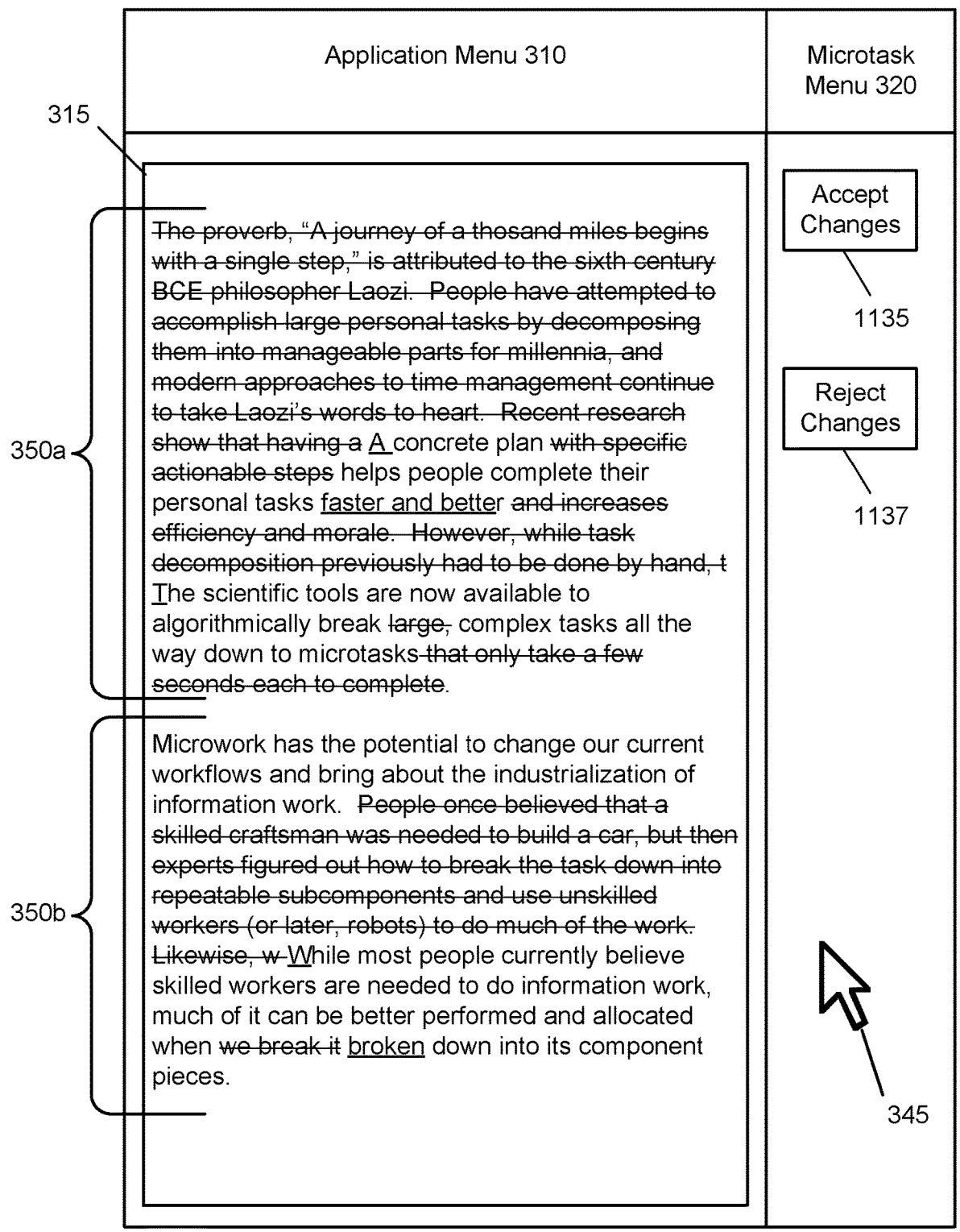
FIG. 11 is an illustration of an example user interface showing one or more completed microtasks to a user.

FIG. 11 is an illustration of a user interface 1100 after the microtasks corresponding to the paragraphs 350*a* and 350*b* have been completed. In the example shown, the paragraphs 350*a* and 350*b* are displayed in the content window 315 to show the changes that were made to each of the paragraphs due to the "shorten" microtasks 130 shown in FIGS. 6-8. The user interface 1100 includes a button 1135 labeled "Accept Changes" and a button 1137 labeled "Reject Changes" that the user may use to either accept or reject the edits proposed by the completed microtasks 130. In some implementations, users may be provided with the option to accept or reject specific portions of the completed microtasks 130. Because the misspelled word 350*c* was deleted by the edits made to paragraph 350*a*, there is no change made to the corresponding text.

Figure 12:
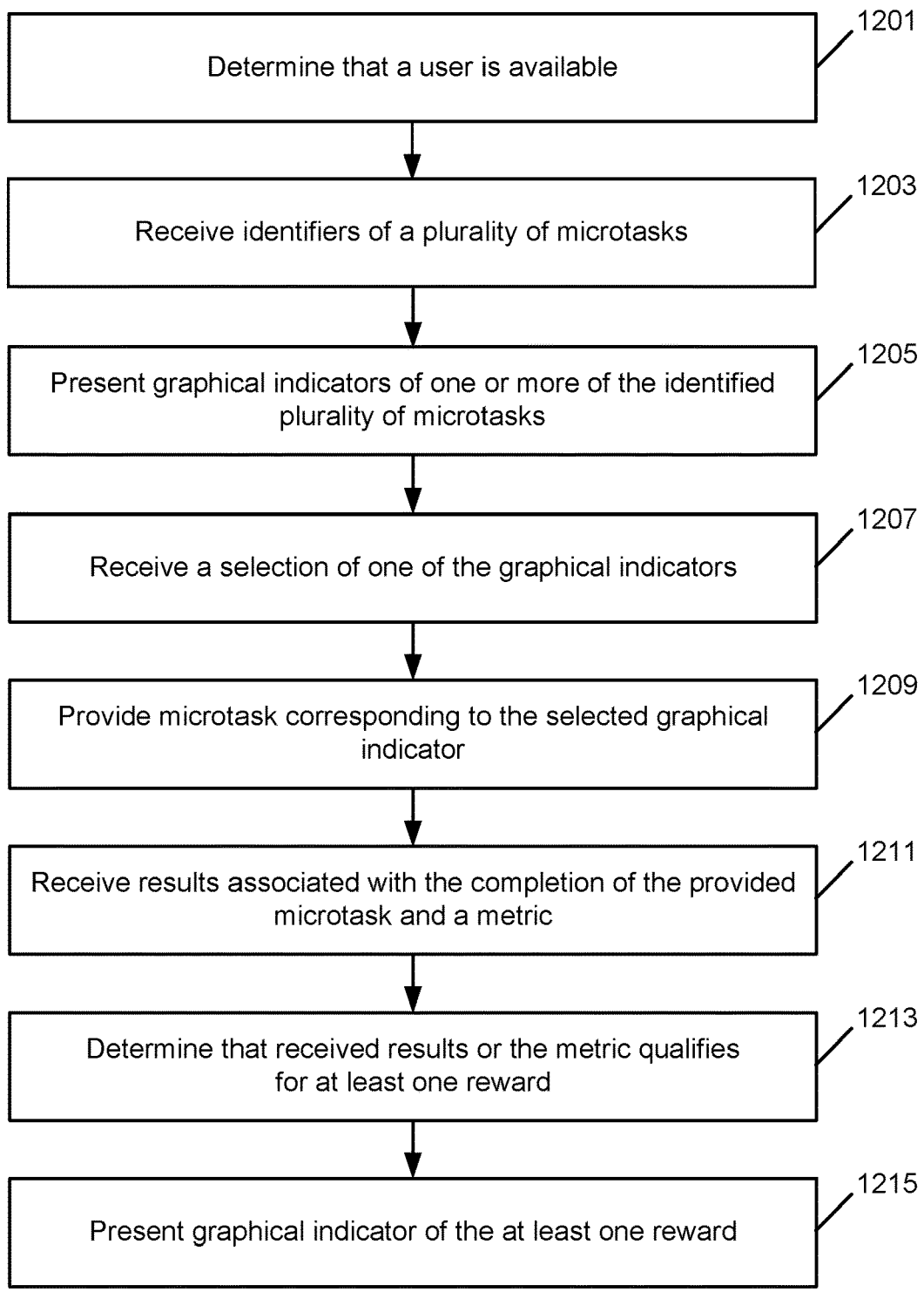
FIG. 12 is an operational flow of an implementation of a method for selecting a microtask, receiving results of the selected microtask, and for providing at least one reward.

FIG. 12 is an operational flow of an implementation of a method 1200 for selecting a microtask 130, receiving results 140 of the selected microtask 130, and for providing at least one reward 145. The method 1200 may be implemented by the microtask engine 160 and/or the microtask client 120.

At 1201, it is determined that a user is available. That the user is available to perform a microtask 130 may be determined by the microtask engine 160 and/or the microtask client 120. In some implementations, that the user is available may be determined based on sensors associated with the client device 110. For example, a GPS sensor may indicate that a user is in a store, and an accelerometer may indicate that the user is waiting in line and therefore may be available. In another implementation, that the user is available may be determined when the user activates an application 117 focused on performing microtasks 130.

At 1203, identifiers of a plurality of microtasks are received. The identifiers of the plurality of microtasks may be received by the microtask client 120 from the presentation engine 225 of the microtask engine 160. Depending on the implementation, the microtasks 130 may correspond to a content item 115 (e.g., document) associated with the user. Each microtask 130 may be associated with metadata that includes a type. The type may identify the task that is associated with the selected microtask 130 such as editing, re-writing, shortening the content, summarizing, reviewing, proofreading, etc. Other types of microtasks 130 may be identified. In addition, the type may be associated with a workflow. The workflow may include the steps that may be completed as part of the selected microtask 130, or how many times that the particular microtask 130 may be completed by the user.

At 1205, graphical indicators of one or more of the identified plurality of microtasks are presented. The graphical indicators may be presented to the user by the microtask client 120 on a display associated with the client device 110. The graphical indicators may be presented based on the metadata associated with the corresponding microtasks 130, such the type of the microtask 130. Depending on the implementation, the graphical indicators may be presented through an application 117 such as a game where the user performs one or more microtasks 130. For example, the microtasks 130 may be presented to the user in a game application 117 in an order that is based on the type of each microtask 130 (i.e., edit, shorten, correct spelling, review comment, etc.). The user may then focus on the types of microtasks 130 that they enjoy performing.

At 1207, a selection of one of the graphical indicators is received. The selection may be received by the microtask engine 160 from the microtask client 120 and/or application 117. The selection may be of one of the graphical indicators presented, and may indicate that the user would like to perform the microtask 130 corresponding to the selected graphical indicator.

At 1209, a microtask corresponding to the selected graphical indicator is provided. The microtask 130 may be provided by the microtask engine 160 to the microtask client 120 and/or the application 117.

At 1211, results associated with the completion of the provided microtask and a metric are received. The results 140 and a metric 143 may be received by the presentation engine 225 of the microtask engine 160. The results 140 may be results generated by the user when completing the selected microtask 130. The metric 143 may be the time it took for the user to complete the selected microtask 130. Other metrics 143 may be used.

At 1213, that the received results or the metric qualifies for at least one reward 145 is determined. The determination may be made by the rewards engine 225 of the microtask engine 160 using the rewards data 237.

At 1215, the at least one reward is presented (e.g., using a graphical indicator). The reward 145 may be presented by the rewards engine 225 of the microtask engine 160. In some implementations, the reward 145 may be presented by displaying the reward 145 to the user in the application 117.

Figure 13:
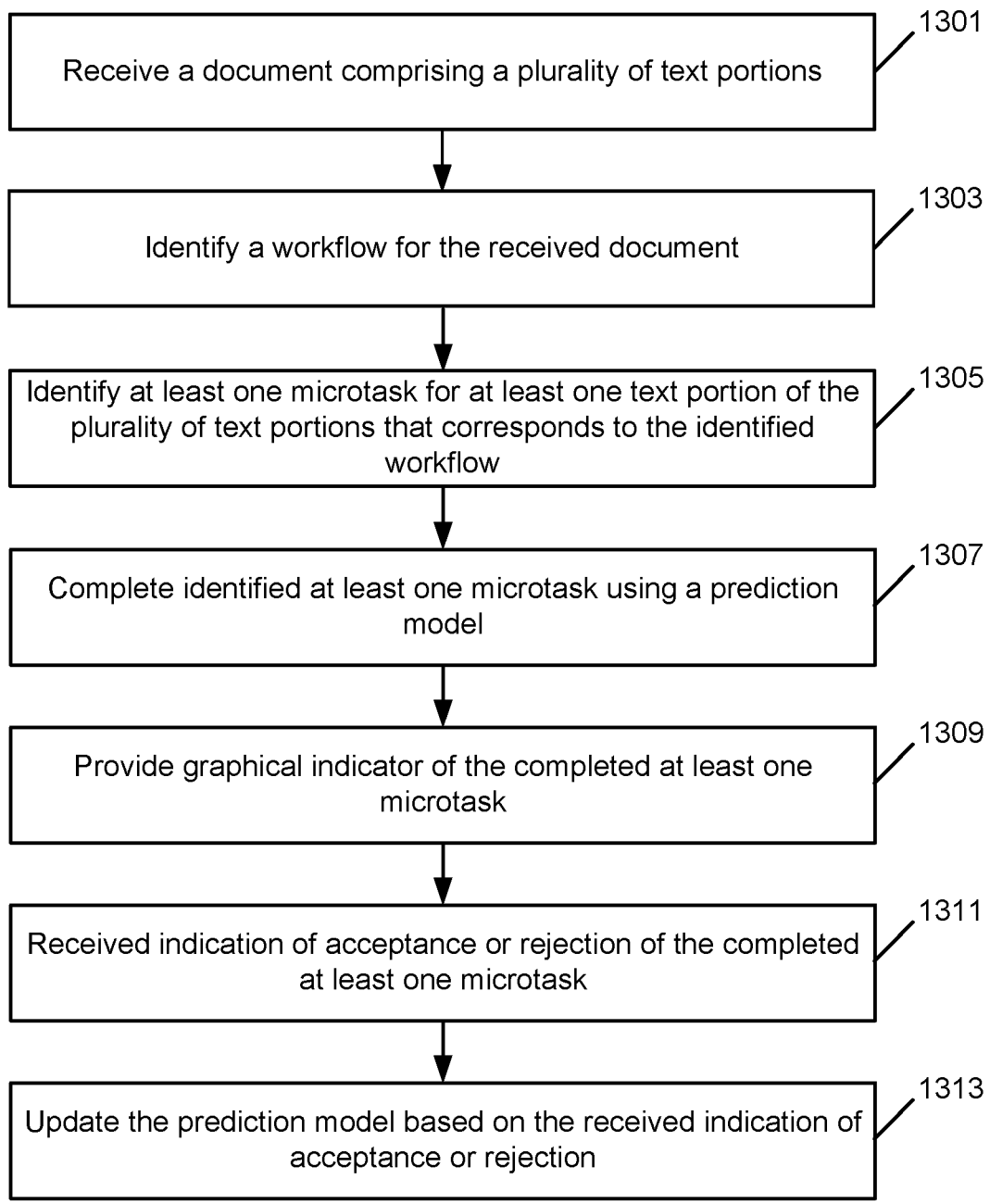
FIG. 13 is an operational flow of an implementation of a method for identifying at least one microtask in a document and for updating a prediction model.

FIG. 13 is an operational flow of an implementation of a method 1300 for identifying at least one microtask 130 in a document and for updating a prediction model. The method 1300 may be implemented by the microtask engine 160 and/or the microtask client 120.

At 1301, a document is received. The document may be received by one or more of a microtask client 120 or a microtask engine 160. The document may be a text document and may include a plurality of text portions. For example, the document may be a webpage or a word processing document.

At 1303, a workflow is identified. The workflow may be identified by the microtask creation engine 210 of the microtask engine 160.

At 1305, at least one microtask corresponding to the identified workflow for at least one portion of the document is identified. The microtask 130 may be identified by the microtask client 120 or the microtask creation engine 210 of the microtask engine 160. In some implementations, the microtasks 130 may be automatically identified in the document by text matching patterns against patterns associated with known microtasks 130 corresponding to the identified workflow. For example, the microtask creation engine 210 or the microtask client 120 may identify paragraphs with spelling or grammatical errors as microtasks 130 of the type "edit" or "rewrite."

At 1307, the at least one microtask is completed using a prediction model. The at least one microtask 130 may be completed by the learning engine 215 using the prediction model 217. The prediction model 217 may have been generated by the learning engine 215 by observing the results 140 generated by the user over time for microtasks 130 of various types, and/or by observing the content of various content items 115 such as documents generated by the user.

At 1309, a graphical indicator of the completed at least one microtask is provided. The graphical indicator may be provided by the presentation engine 225 of the microtask engine 160. In some implementations, the graphical indicator of the completed at least one microtask 130 may be presented as part of a different microtask 130 asking the user to approve or reject the results 140 associated with the completed at least one microtask 130. For example, where the microtask 130 completed by the learning engine 215 is a tagged photograph, the user may be presented with a microtask 130 asking if they approve or reject the way that the learning engine 215 tagged the photograph (i.e., the results 140).

At 1311, an indication of acceptance or rejection of the completed at least one microtask is received. The indication of acceptance or rejection may be received by the learning engine 215 of the microtask engine 160.

At 1313, the prediction model is updated based on the indication or acceptance or rejection. The prediction model 217 may be updated by the learning engine 215 of the microtask engine 160. Any method for updating a prediction model 217 based on positive feedback (i.e., an indication of acceptance) or negative feedback (i.e., an indication of rejection) may be used.

FIG. 14 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 14, an exemplary system for implementing aspects described herein includes a computing device, such as computing device 1400. In its most basic configuration, computing device 1400 typically includes at least one processing unit 1402 and memory 1404. Depending on the exact configuration and type of computing device, memory 1404 may be volatile (such as random access memory (RAM)), non-volatile (such as read-only memory (ROM), flash memory, etc.), or some combination of the two. This most basic configuration is illustrated in FIG. 14 by dashed line 1406.

Computing device 1400 may have additional features/functionality. For example, computing device 1400 may include additional storage (removable and/or non-removable) including, but not limited to, magnetic or optical disks or tape. Such additional storage is illustrated in FIG. 14 by removable storage 1408 and non-removable storage 1410.

Computing device 1400 typically includes a variety of computer readable media. Computer readable media can be any available media that can be accessed by the device 1400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1404, removable storage 1408, and non-removable storage 1410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 1400.

Computing device 1400 may contain communication connection(s) 1412 that allow the device to communicate with other devices. Computing device 1400 may also have input device(s) 1414 such as a keyboard, mouse, pen, voice input device, touch input device, etc. Output device(s) 1416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method for automatically completing identified microtasks using a prediction model and for updating the prediction model based on feedback is provided. The method includes receiving a document comprising a plurality of text portions by a computing device, identifying a workflow for the document by the computing device, identifying at least one microtask for at least one text portion of the plurality of text portions corresponding to the identified workflow by the computing device, completing the at least one microtask using a prediction model by the computing device, presenting a graphical indicator of the completed at least one microtask by the computing device, receiving an indication of acceptance or an indication of rejection of the completed at least one microtask by the computing device, and updating the prediction model based on the received indication of acceptance or indication of rejection by the computing device.

Implementations may include some or all of the following features. Identifying the at least one microtask may include matching a pattern associated with the at least one microtask and the workflow with the at least one text portion. The at least one microtask includes one or more of editing the document, re-writing the document, shortening the document, summarizing the document, reviewing the document, and/or proofreading the document.

In an implementation, a method for incentivizing the completion of microtasks by providing one or more rewards is provided. The method includes presenting graphical indicators of one or more microtasks by a computing device, receiving a selection of one of the graphical indicators by the computing device, in response to the selection, providing the microtask corresponding to the selected graphical indicator for completion by the computing device, receiving results associated with the completion of the selected microtask and a metric for the selected microtask by the computing device, determining that the received results or the metric qualifies for at least one reward by the computing device, and providing a graphical indicator of the at least one reward by the computing device.

Implementations may include some or all of the following features. The at least one reward may include one or more of a graphical badge, a coupon, an achievement, a credit for the purchase of an application, and/or a credit for an in-application purchase. The selected microtask may include one or more of editing a document, re-writing the document, shortening the document, summarizing the document, reviewing the document, and/or proofreading the document. The method may further include presenting a graphical indicator of the metric for the selected microtask, and a graphical indicator of a metric associated with at least one microtask that is different than the selected microtask. The method may further include calculating an average metric for a plurality of microtasks that include the selected microtask and presenting a graphical indicator of the calculated average metric.

In an implementation, a system for presenting and completing microtasks is provided. The system includes at least one computing device and a microtask engine. The microtask engine is adapted to receive identifiers of a plurality of microtasks for a content item, present graphical indicators of one or more of the identified plurality of microtasks, receive a selection of one of the graphical indicators, in response to the selection, provide the microtask corresponding to the selected graphical indicator for completion, receive results associated with the completion of the selected microtask and a metric for the selected microtask, and provide the results and the metric for the provided microtask.

Implementations may include some or all of the following features. The content item may include a document and the provided microtask may include one or more of editing the document re-writing the document, shortening the document, summarizing the document, reviewing the document, and/or proofreading the document. The microtask engine may be further adapted to present a graphical indicator of the metric for the provided microtask, and present a graphical indicator of a metric associated with at least one microtask that is different than the provided microtask. The microtask engine may be further adapted to calculate an average metric for a plurality of microtasks that include the provided microtask, and present a graphical indicator of the calculated average metric. The microtask engine may be further adapted to complete the provided microtask using a prediction model and present a graphical indicator of the completed microtask. The received results may include an indication of acceptance or an indication of rejection of the completed microtask. The microtask engine may be further adapted to update the prediction model based on the indication of acceptance or the indication of rejection. The content item may include an image database, and the provided microtask may include one or more of editing an image of the image database, tagging one or more faces in an image of the image database, or culling one or more images from the images of the image database. The microtask engine may be further adapted to determine that a user associated with the content item is available, and present the graphical indicators of the one or more of the identified plurality of microtasks at a computing device associated with the user. The computing device associated with the user may include one or more of a smart phone or a tablet computer. Each microtask may be associated with metadata, and the microtask engine adapted to present graphical indicators of one or more of the identified microtasks may include the microtask engine adapted to present graphical indicators of one or more of the identified microtasks based on the metadata. The microtask engine may be further adapted to provide at least one reward based on the received results associated with the completion of the selected microtask and the completion time. The at least one reward may include one or more of a graphical badge, a coupon, an achievement, a credit for the purchase of an application, and/or a credit for an in-application purchase.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer system for presenting and completing microtasks comprising:
   at least one computing device; and
   a microtask engine adapted to:
      receive computer-implemented identifiers of a plurality of computer-implemented microtasks for a computer-implemented content item;
      present computer-implemented graphical indicators of one or more of the identified plurality of microtasks;
      receive a computer-implemented selection of one of the graphical indicators;
      in response to the selection, provide a microtask of the plurality of microtasks corresponding to the selected graphical indicator for completion;
      receive a computer-implemented prediction model that has been generated or updated by one or more computer components based on prior results for use in task completion;
      complete the provided microtask using the prediction model, wherein the completing of the provided microtask comprises performing one or more operations on the content item in the computer system using the prediction model, and wherein the completing of the provided microtask comprises generating computer-implemented results of the completing of the provided microtask;
      present a computer-implemented graphical indicator of the completed microtask;
      receive a computer-implemented indication of acceptance or a computer-implemented indication of rejection of the completed microtask; and
      provide the results of the completing of the provided microtask.

2. The system of claim 1, wherein the content item comprises a document, and the provided microtask comprises one or more of editing the document, re-writing the document, shortening the document, summarizing the document, reviewing the document, or proofreading the document.

3. The system of claim 1, wherein the microtask engine is further adapted to present a graphical indicator of a metric for the provided microtask, and present a graphical indicator of a metric associated with at least one microtask that is different than the provided microtask.

4. The system of claim 1, wherein the microtask engine is further adapted to:
   calculate an average metric for a plurality of microtasks that include the provided microtask; and
   present a graphical indicator of the calculated average metric.

5. The system of claim 1, where the microtask engine is further adapted to update the prediction model based on the indication of acceptance or the indication of rejection.

6. The system of claim 1, wherein the content item comprises an image database, and the provided microtask comprises one or more of editing an image of the image database, tagging one or more faces in an image of the image database, or culling one or more images from the images of the image database.

7. The system of claim 1, wherein the microtask engine is further adapted to determine that a user associated with the content item is available, and present the graphical indicators of the one or more of the identified plurality of microtasks at a computing device associated with the user.

8. The system of claim 7, wherein the computing device associated with the user comprises one or more of a smart phone or a tablet computer.

9. The system of claim 1, wherein each microtask is associated with metadata, and the microtask engine is adapted to present graphical indicators of one or more of the identified plurality of microtasks comprises the microtask engine adapted to present graphical indicators of one or more of the identified plurality of microtasks based on the metadata.

10. The system of claim 1, wherein the microtask engine is further adapted to provide at least one reward based on the results of the completing of the provided microtask and a completion time.

11. The system of claim 1, wherein the at least one reward comprises one or more of a graphical badge, a coupon, an achievement, a credit for the purchase of an application, and a credit for an in-application purchase.

12. A method for automatically completing identified microtasks using a prediction model and for updating the prediction model based on feedback comprising:
   receiving a computer-implemented document comprising a plurality of text portions by a computing device;
   identifying a computer-implemented workflow for the document by the computing device;
   identifying at least one computer-implemented microtask for at least one text portion of the plurality of text portions corresponding to the identified workflow by the computing device;
   completing the at least one microtask using a computer-implemented prediction model by the computing device, wherein the completing of the at least one microtask comprises performing one or more operations on the document in a computer system using the prediction model, and wherein the completing of the at least one microtask comprises generating computer-implemented results of the completing of the at least one microtask;
   presenting a computer-implemented graphical indicator of the completed at least one microtask by the computing device;
   receiving a computer-implemented indication of acceptance or a computer-implemented indication of rejection of the completed at least one microtask by the computing device; and
   updating the prediction model based on the received indication of acceptance or indication of rejection by the computing device.

13. The method of claim 12, wherein identifying the at least one microtask comprises matching a pattern associated with the at least one microtask and the workflow with the at least one text portion.

14. The method of claim 12, wherein the at least one microtask comprises one or more of editing the document, re-writing the document, shortening the document, summarizing the document, reviewing the document, or proofreading the document.

15. A computer-implemented method comprising:
presenting computer-implemented graphical indicators of one or more computer-implemented microtasks by a computing device;
receiving a computer-implemented selection of one of the graphical indicators by the computing device;
in response to the selection, providing a microtask of the one or more microtasks corresponding to the selected graphical indicator for completion by the computing device;
receive a computer-implemented prediction model that has been generated or updated by one or more computer components based on prior results for use in task completion; and
completing the provided microtask using the prediction model by the computing device, wherein the completing of the provided microtask comprises performing one or more operations on a computer-implemented content item in a computer system using the computer-implemented prediction model, and wherein the completing of the provided microtask comprises generating computer-implemented results of the completing of the provided microtask; and
receiving computer-implemented results associated with the completion of the provided microtask and a computer-implemented metric for the provided microtask by the computing device.

16. The method of claim 15, further comprising:
determining that the received results or the metric qualifies for at least one reward by the computing device; and
providing a graphical indicator of the at least one reward by the computing device;
wherein the at least one reward comprises one or more of a graphical badge, a coupon, an achievement, a credit for the purchase of an application, and a credit for an in-application purchase.

17. The method of claim 15, wherein the provided microtask comprises one or more of editing a document, re-writing the document, shortening the document, summarizing the document, reviewing the document, or proofreading the document.

18. The method of claim 15, further comprising presenting a graphical indicator of the metric for the provided microtask, and a graphical indicator of a metric associated with at least one microtask that is different than the provided microtask.

19. The method of claim 15, further comprising:
calculating an average metric for a plurality of microtasks that include the provided microtask; and
presenting a graphical indicator of the calculated average metric.

20. The method of claim 15, wherein the received results comprise an indication of acceptance or an indication of rejection of the completed microtask, and wherein the method further comprises updating the prediction model based on the indication of acceptance or the indication of rejection.

* * * * *